US009189272B2

(12) United States Patent
Kanemasa et al.

(10) Patent No.: US 9,189,272 B2
(45) Date of Patent: Nov. 17, 2015

(54) INFORMATION PROCESSING APPARATUS, COMPUTER PROGRAM, AND METHOD FOR CONTROLLING EXECUTION OF JOBS

(75) Inventors: Yasuhiko Kanemasa, Kawasaki (JP); Motoyuki Kawaba, Kawasaki (JP); Calton Pu, Atlanta, GA (US); Qingyang Wang, Atlanta, GA (US)

(73) Assignees: FUJITSU LIMITED, Kawasaki (JP); THE GEORGIA TECH RESEARCH CORPORATION, Atlanta, GA (US)

( * ) Notice: Subject to any disclaimer, the term of this patent is extended or adjusted under 35 U.S.C. 154(b) by 277 days.

(21) Appl. No.: 13/597,507

(22) Filed: Aug. 29, 2012

(65) Prior Publication Data

US 2014/0068623 A1   Mar. 6, 2014

(51) Int. Cl.
*G06F 9/48* (2006.01)
(52) U.S. Cl.
CPC ........ *G06F 9/4881* (2013.01); *G06F 2209/485* (2013.01); *G06F 2209/486* (2013.01)
(58) Field of Classification Search
None
See application file for complete search history.

(56) References Cited

U.S. PATENT DOCUMENTS

| 6,341,240 B1 * | 1/2002 | Bermon et al. | 700/97 |
| 6,754,658 B1 | 6/2004 | Matsuno | |
| 2002/0178232 A1 * | 11/2002 | Ferguson | 709/217 |
| 2005/0081211 A1 * | 4/2005 | Koga et al. | 718/105 |
| 2009/0165007 A1 * | 6/2009 | Aghajanyan | 718/103 |
| 2013/0226639 A1 * | 8/2013 | Yokoyama et al. | 705/7.14 |

FOREIGN PATENT DOCUMENTS

JP   2001-229058   8/2001

OTHER PUBLICATIONS

Briquet et al. Scheduling Data-Intensive Bags of Tasks in P2P Grids with BitTorrent-enabled Data Distribution. [online] (Jun. 26, 2007). ACM., pp. 39-48. Retrieved From the Internet <http://dl.acm.org/citation.cfm?id=1272990>.*
Patent Abstracts of Japan, Publication No. 2001-229058, Published Aug. 24, 2001.

* cited by examiner

*Primary Examiner* — Emerson Puente
*Assistant Examiner* — Jonathan R Labud
(74) *Attorney, Agent, or Firm* — Staas & Halsey LLP

(57) ABSTRACT

An information processing apparatus submits jobs for execution on a server. Jobs are classified into a plurality of groups, and these groups are ranked in ascending order of workload that the groups of jobs impose on the server. A processor in the information processing apparatus counts ongoing jobs that are currently executed on the server and belong to a specified number of top-ranked groups. The processor designates pending jobs that belong to other groups than the specified number of top-ranked groups and suspends submission of processing requests of the designated pending jobs to the server, when the number of ongoing jobs is greater than or equal to a threshold and when there are one or more pending jobs that belong to the specified number of top-ranked groups.

10 Claims, 29 Drawing Sheets

INFORMATION PROCESSING APPARATUS, COMPUTER PROGRAM, AND METHOD FOR CONTROLLING EXECUTION OF JOBS

FIELD

The embodiments discussed herein relate to an information processing apparatus, computer program, and method for controlling execution of server jobs.

BACKGROUND

Some of the computer systems used today include a plurality of computers that are hierarchically organized to share the processing workload. Computer systems of this type are called "multi-tier systems." A known example of such multi-tier systems is a three-tier system that is formed from a web server to provide user interfaces, an application server to execute transactions, and a database server to manage datasets. Those servers work together to execute processing requests received from users and return the results back to the requesting users. In this way, a multi-tier system allots a given work to a plurality of servers, thus providing an improved reliability and responsiveness.

Improvement of responsiveness may also be achieved by enhancing the operating efficiency of individual servers constituting the multi-tier system. For example, a proposed design of a database server system is directed to efficient usage of limited database resources to provide service to a larger number of users. See, for example, Japanese Laid-open Patent Publication No. 2001-229058.

When a multi-tier system has a massive workload, a server in a particular tier of the system may approach its performance limit. In other words, the increased workload drives the server toward performance saturation. Such condition of a server is detected by observing the response time of jobs executed on the server. For example, an average response time of a server is monitored at unit time intervals. If an extreme increase is observed during a certain period, it means that the server is saturated in that period. The length of time intervals at which average response time is analyzed is referred to herein as "time granularity." A fine time granularity means a minute interval of analysis.

The above-noted response time analysis may sometimes suggest different results, depending on the time granularity used. Even when no saturation is found by an analysis with a coarse time granularity, another analysis performed with a fine time granularity may suggest partial saturation. Suppose, for example, that the average usage ratio of central processing unit (CPU) is observed to be 80% when the calculation is performed at intervals of 1 second. However, by changing the interval to 0.1 seconds, the analysis may find that the CPU usage ratio actually hits 100% at some particular moments.

As described above, instantaneous performance saturation is only observable with fine time granularities. When this type of saturation occurs to a low-tier server in a multi-tier system, its effect spreads over the other tiers and thus results in a wild fluctuation of average response time of the system as a whole. Under such situations, some end users would experience a perceived delay of response from the system if their job processing requests happened to meet performance saturation of servers. This kind of user experience is not desirable even though it occurs only to a limited number of users.

SUMMARY

According to an aspect of the embodiments to be discussed herein, there is provided an information processing apparatus coupled to a server. This information processing apparatus includes a processor configured to perform a procedure including the following acts: classifying jobs to be executed by a server into a plurality of groups, the groups being ranked in ascending order of workload that the groups of jobs impose on the server; counting the number of ongoing jobs that are currently executed on the server and belong to a specified number of top-ranked groups; and designating pending jobs that belong to other groups than the specified number of top-ranked groups and suspending submission of processing requests of the designated pending jobs to the server, when the number of ongoing jobs is greater than or equal to a threshold and when there are one or more pending jobs that belong to the specified number of top-ranked groups.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Several embodiments will be described below with reference to the accompanying drawings. Each of those embodiments may be combined with other embodiments as long as there are no contradictions between them.

(a) First Embodiment

The description begins with a first embodiment designed to prevent the average response time per unit time of a computer system from fluctuating wildly even if some server in the system goes into instantaneous saturation that is only observable with a fine time granularity.

Figure 1:
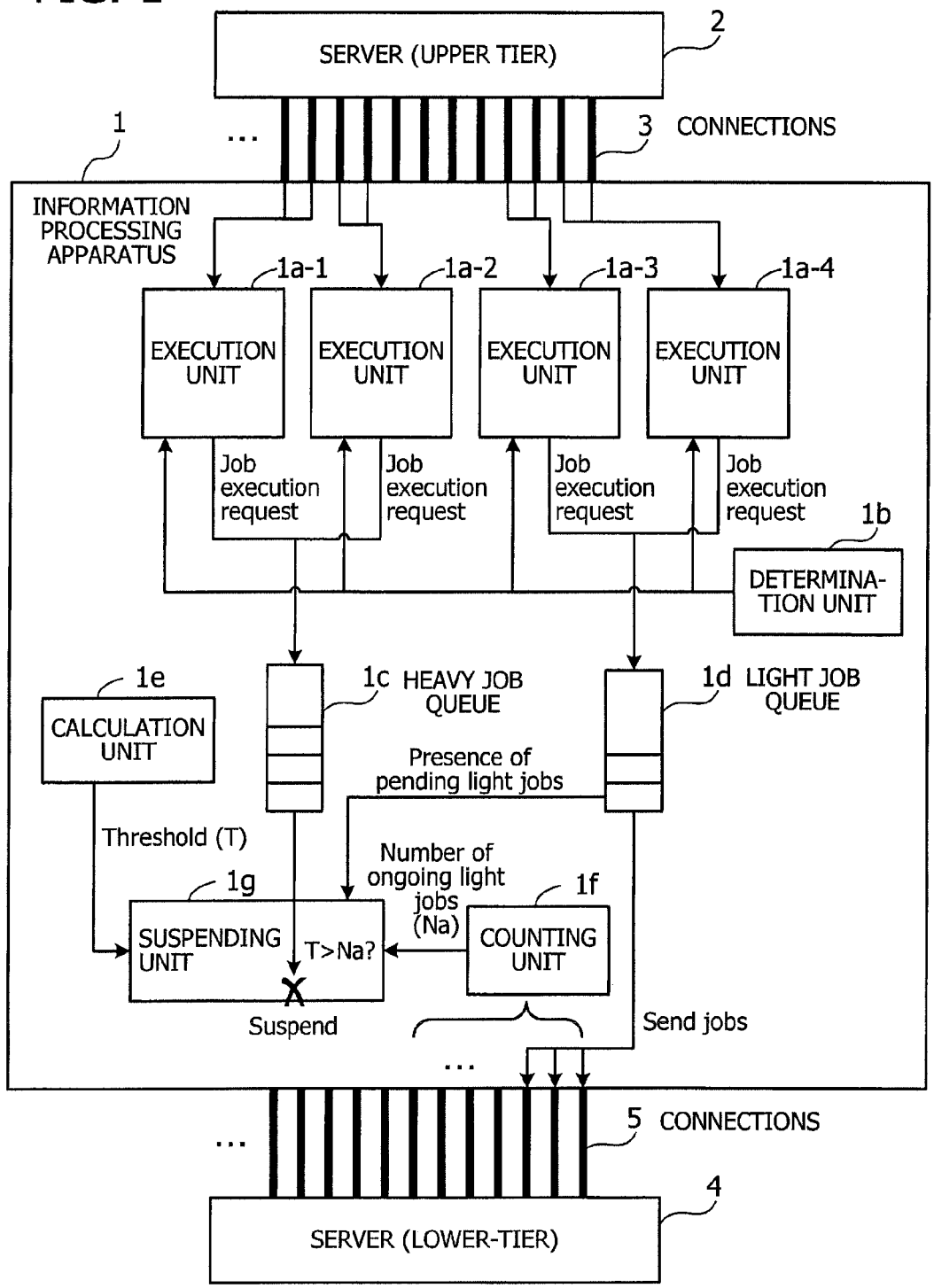
FIG. 1 illustrates an exemplary structure of an information processing apparatus according to a first embodiment.

FIG. 1 illustrates an exemplary structure of an information processing apparatus according to the first embodiment. In the example of FIG. 1, the illustrated information processing apparatus 1 works as part of a multi-tier system, being placed below one server 2 and above another server 4. The information processing apparatus 1 executes jobs upon receipt of job processing requests from the upper-tier server 2 through a set of connections 3. During this course, the information processing apparatus 1 sends its own job processing requests to the lower-tier server 4 through another set of connections 5.

The illustrated information processing apparatus 1 includes a plurality of execution units 1a-1, 1a-2, 1a-3, and 1a-4, a determination unit 1b, a heavy job queue 1c, a light job queue 1d, a calculation unit 1e, a counting unit 1f, and a suspending unit 1g. The execution units 1a-1, 1a-2, 1a-3, and 1a-4 execute requested jobs according to job processing requests received from the upper-tier server 2. During the course of this job execution, the execution units 1a-1, 1a-2, 1a-3, and 1a-4 may produce new jobs for the lower-tier server 4 and thus output processing requests for the produced jobs.

The jobs that the execution units 1a-1, 1a-2, 1a-3, and 1a-4 may produce are divided into two or more groups. In the example of FIG. 1, one group is formed from jobs produced by two execution units 1a-1 and 1a-2, and another group is formed from jobs produced by another two execution units 1a-3 and 1a-4. These groups are ranked in ascending order of workload that their constituent jobs impose on the lower-tier server 4. That is, a job group with a lighter workload is ranked at a higher position than that with a heavier workload. The workload of jobs may be determined, for example, as the processing time that the lower-tier server 4 takes to execute the jobs. It is assumed here in FIG. 1 that the group of jobs produced by two execution units 1a-3 and 1a-4 on the right has a higher rank than the group of jobs produced by another two execution units 1a-1 and 1a-2 on the left.

When there arise some jobs for execution by the lower-tier server 4, the execution units 1a-1, 1a-2, 1a-3, and 1a-4 enqueue the jobs into different queues, depending on to which group the individual jobs belong. Each queue is dedicated for a particular group of jobs. For example, the first two execution units 1a-1 and 1a-2 enqueue their job processing requests into a heavy job queue 1c. The second two execution units 1a-3 and 1a-4, on the other hand, enqueue their job processing requests to a light job queue 1d.

The determination unit 1b classifies jobs into a plurality of groups according to their categories. For example, the execution units 1a-1, 1a-2, 1a-3, and 1a-4 may produce different categories of jobs. The determination unit 1b identifies the category of each produced job and determines to which group that job is supposed to belong. More specifically, the determination unit 1b calculates average processing time of each specific category of jobs that the lower-tier server 4 spent to execute jobs in that category. The determination unit 1b then determines job groups in such a way that a job category having a shorter average processing time belongs to a higher-ranked group of jobs.

In classifying jobs into groups, the determination unit 1b may also rely on the occurrence rates of jobs in different categories, in addition to the average processing time noted above. The occurrence rate of a particular category of jobs refers to its ratio to the entire set of jobs in all categories. For example, the determination unit 1b calculates average processing time and occurrence rate of each job category and then produces various grouping patterns of job categories. Then, for each grouping pattern, the determination unit 1b calculates a reduction ratio of job processing time which is to be obtained by suspending job processing requests for other than a specified number of top-ranked groups. The determination unit 1b then selects one of the grouping patterns that exhibits the largest reduction ratio. The grouping pattern selected in this way is used to determine which category of jobs belongs to which group. The determination unit 1b informs the execution units 1a-1, 1a-2, 1a-3, and 1a-4 of this determination result about job groups. This information permits the execution units 1a-1, 1a-2, 1a-3, and 1a-4 to recognize appropriate queues for their job processing requests.

The information processing apparatus 1 has a plurality of queues for temporarily storing jobs that are supposed to be executed by the lower-tier server 4. Provided in the example of FIG. 1 are a heavy job queue 1c and a light job queue 1d. The heavy job queue 1c is a queue for buffering processing requests of jobs that belong to a heavy job group. The light job queue 1d is a queue for buffering processing requests of jobs that belong to a light job group.

The calculation unit 1e calculates a threshold for use by the suspending unit 1g in determining whether to send execution requests of heavy jobs to the lower-tier server 4. This calculation may be based on the statistic of jobs executed in the past. For example, the calculation unit 1e calculates average processing time that the lower-tier server 4 spent to execute jobs that belong to each particular group. The calculation unit 1e also calculates an occurrence rate of those jobs to the entire set of jobs executed by the lower-tier server 4. Based on the average processing time and occurrence rate of each group, the calculation unit 1e calculates a threshold T, where T is a real number greater than zero. For example, the calculation unit 1e multiplies the average processing time of a group by its corresponding occurrence rate. The calculation unit 1e repeats this for every different group. The calculation unit 1e then adds up the resulting products for a specified number of top-ranked groups (i.e., the topmost group, second-to-the-top group, third-to-the-top group and so on, as many as specified), adds up the products for the entire set of groups, and divides the former sum by the latter sum. The calculation unit 1e further multiplies the quotient of that division by the maximum number of jobs that the lower-tier server 4 is allowed to execute concurrently and assigns the resulting product as a threshold T. The calculation unit 1e then informs the suspending unit 1g of the calculated threshold T.

The counting unit 1f counts the number (Na) of ongoing jobs that are being executed on the lower-tier server 4 and belong to the specified number of top-ranked groups noted above, where Na is an integer greater than zero. For example, this number Na of ongoing jobs may be obtained as the number of connections 5 used to deliver processing requests of light jobs to the lower-tier server 4.

The suspending unit 1g determines whether the following two conditions are satisfied: (i) the number Na of ongoing jobs is greater than or equal to the threshold T, and (ii) there is at least one pending job that belongs to the specified number of top-ranked groups. When these two conditions are both satisfied, the suspending unit 1g suspends submission of processing requests to the lower-tier server 4 for the pending jobs that belong to the remaining groups (i.e., those other than the specified number of top-ranked groups). The second condition (ii) noted above may be tested by, for example, checking whether the light job queue 1d contains at least one job processing request. The suspending unit 1g may execute the act of suspending submission of processing requests for the remaining groups of jobs by stopping allocation of connections for the requesting execution units, so that their job processing request do not reach the lower-tier server 4 for at least the time being.

In operation of the above-described information processing apparatus 1, the execution units 1a-1, 1a-2, 1a-3, and 1a-4 execute jobs when they are requested from the upper-tier server 2. During this execution, the execution units 1a-1, 1a-2, 1a-3, and 1a-4 may spawn new jobs for the lower-tier server 4. Here the execution units 1a-1, 1a-2, 1a-3, and 1a-4 have previously been informed by the determination unit 1b of how such jobs for the lower-tier server 4 are classified into groups. The execution units 1a-1, 1a-2, 1a-3, and 1a-4 thus send the processing requests for new jobs to their relevant queues, depending on to which group each job belongs.

Job processing requests enqueued to the light job queue 1d are sent one by one to the lower-tier server 4 via their respective connections 5. The lower-tier server 4 thus executes received light jobs. The counting unit 1f counts those light jobs running on the lower-tier server 4.

The suspending unit 1g, on the other hand, has previously been informed of a threshold T calculated by the calculation unit 1e. When some job processing requests are enqueued into the heavy job queue 1c, the suspending unit 1g determines whether the number Na of ongoing light jobs currently running on the lower-tier server 4 is smaller than the given threshold T. When Na is smaller than T, a job processing request is read out of the heavy job queue 1c and sent to the lower-tier server 4 via one of the connections 5. When Na is greater than or equal to T, the job processing requests in the heavy job queue 1c are suspended. That is, no transmission to the lower-tier server 4 occurs at the moment for those pending heavy jobs.

The above-described control minimizes the chance for heavy-workload jobs to influence the execution of low-workload jobs in the lower-tier server 4, thus preventing the multi-tier system from having a wild fluctuation of average response time. More specifically, the first embodiment is designed to perform priority control when executing requested jobs, on the basis of the number of ongoing jobs in the lower-tier server 4 which belong to top-ranked groups. In other words, this priority control observes variations of the number of concurrent jobs to determine whether the resources in the lower-tier server 4 are becoming saturated or not. It is therefore possible to detect near-saturation of the lower-tier server 4 at an appropriate time point just before it reaches full saturation. Upon detection of this particular state of the lower-tier server 4, processing requests of new heavy jobs are suspended before it is too late (i.e., before the number of pending jobs in a light job queue 1d exceeds a threshold T). The existing pending light jobs, now having priority over heavy jobs, are allowed to proceed to the lower-tier server 4 and executed without being influenced by the progress of heavy jobs. Since those light jobs do not take long to finish, their connections can be released soon. Average response time of the system does not increase because many jobs are processed in a short time. In this way, the first embodiment prevents influence of near-saturation of the lower-tier server 4 from multiplying in the information processing apparatus 1 or upper-tier server 2, thus enabling the multi-tier system to operate without wild fluctuations of response time.

The execution units 1a-1, 1a-2, 1a-3, and 1a-4, determination unit 1b, calculation unit 1e, counting unit 1f, and suspending unit 1g discussed above in FIG. 1 may be implemented as procedures performed by a processor in the information processing apparatus 1. Further, the above-described heavy job queue 1c and light job queue 1d may be implemented on a random access memory (RAM) in the information processing apparatus 1. It is also noted that the lines interconnecting the functional blocks in FIG. 1 are only an example. The person skilled in the art would appreciate that there may be other communication paths in actual implementations.

(b) Second Embodiment

This section describes a second embodiment in which the proposed job priority control is applied to a web three-tier system, so that the response time of servers on each tier will not fluctuate too much. In the following explanation, the terms "submit" and "submission" will be used to refer to the act of sending a job processing request to servers. In this web three-tier system, a lower tier may fall into saturation of processing performance when it is monitored with a fine time granularity. Such saturation state would bring a wild fluctuation to the system's response. The detailed mechanism of producing response time fluctuations may be explained as a succession of six stages described below.

Stage 1: Each tier of the system receives a varying number of input jobs. That is, the number of input jobs varies with time when it is measured with a fine time granularity. This is a natural fluctuation inherent to the system.

Stage 2: As the system's workload increases, the stream of input jobs begins to saturate the processing performance of one or more tiers of the system. In this stage, however, performance saturation of tiers appears to be intermittent events which can only be observed by monitoring average response time with a fine time granularity.

Step 3: At the moment when a tier of the system reaches its performance limit, all the jobs that use that saturated tier are forced to wait until the tier recovers its performance capacity.

Step 4: The multi-tier system is dealing with a mixture of light jobs (i.e., jobs with shorter processing times) and heavy jobs (i.e., jobs with longer processing times). During the waiting period caused in the preceding stage, a light job has to wait for completion of a heavy job. Accordingly the response time of light jobs increases in this situation similarly to heavy jobs. As a result, the saturated tier exhibits an upsurge of average response time of jobs on that tier, regardless of whether they are heavy jobs or light jobs.

Stage 5: The upsurge of average response time leads to an increased number of jobs that are processed concurrently, and a consequent exhaustion of limited software resources (e.g., processes, threads, connections) in its upper tier. After all, the above stages 3 to 5 are repeated recursively.

Stage 6: The amount of input jobs may hit the peak and then begin to decrease. The saturated tier thus regains its performance margin, becomes more responsive to requests, and finally comes back to the original level of response times.

The above mechanism may produce an abrupt increase or wild fluctuation of response time even when every tier in the system seems to be operating with a good amount of performance margin in terms of the average values. Here the system provides service to end users under a specific service-level agreement (SLA). An abrupt increase of response time could hamper the system from achieving the level of service defined in the SLA. Also, such behavior of the system could be misinterpreted as an unknown degradation of performance that needs investigation and troubleshooting, which may result in an increased cost of operations and maintenance.

A deeper analysis reveals the following two factors in the mechanism of fluctuations. The first factor comes from the fact that a multi-tier computer system deals with a variety of jobs which consume different amounts of resources in the system. From a viewpoint of a particular resource, its usage depends on the type of jobs. One group of jobs occupies a resource for only a short time, whereas another group of jobs occupies the same resource for a long time. The former group is referred to as light jobs, and the latter group is referred to as heavy jobs. Saturation of that particular resource causes a quick and significant increase of response time of light jobs because their execution is influenced by the progress of heavy jobs. This is what the first factor means.

The second factor is that the increase of response time accelerates itself. That is, an increase of response time resulting from the first factor leads to a larger number of concurrent jobs, and consequent exhaustion of limited software resources in upper tiers accelerates the increase of response time.

Figure 2:
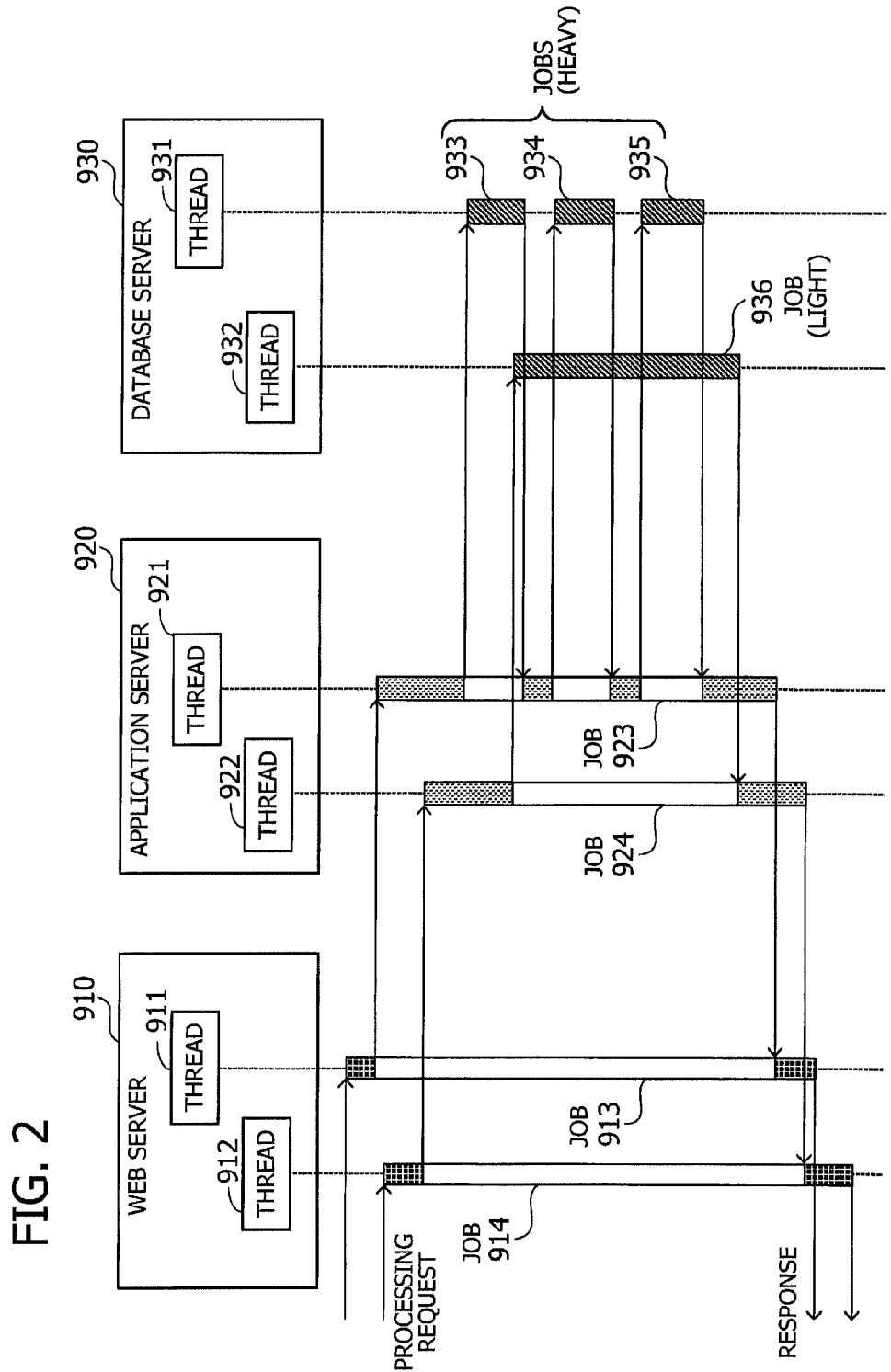
FIG. 2 is a sequence diagram that explains what brings about wild fluctuations of response time.

The above two factors will now be explained by way of example, with reference to FIG. 2. FIG. 2 is a sequence diagram that explains what brings about wild fluctuations of response time. Illustrated in FIG. 2 are interactions among a web server 910, an application server 920, and a database server 930. Two threads 911 and 912 have been produced on the web server 910 in response to two processing requests received from user terminal devices. These threads 911 and 912 execute their respective jobs 913 and 914 according to what is specified in the received processing requests. During the execution of jobs 913 and 914, the threads 911 and 912 may need some interactions with the application server 920. When this is the case, the threads 911 and 912 produce new jobs for the application server 920 and submit them to the application server 920.

In response to the job submission from the web server 910, the application server 920 spawns two threads 921 and 922. Specifically, one thread 921 is to execute a job 923 submitted from its source thread 911. The other thread 922 is to execute a job 924 submitted from its source thread 912. As seen in FIG. 2, the first thread 921 submits three jobs 933 to 935 to the database server 930 during the execution of its own job 923. While the database server 930 can execute each job 933 to 935 in a relatively short time, this series of jobs 933 to 935 is treated as a heavy job because of its long total duration from the beginning of the first job 933 to the end of the third job 935. On the other hand, the second thread 922 on the application server 920 submits only one job 936 to the database server 930. It is assumed here that this job 936 is usually a light job that can be executed in a short time unless the performance of the database server 930 is saturated.

As described above, the two threads 921 and 922 on the application server 920 submit job processing requests to the database server 930 when they need interactions with the database server 930 during the course of their own jobs 923 and 924. One thread 931 on the database server 930 executes jobs 933 to 935 submitted from the thread 921. Similarly, another thread 932 on the database server 930 executes a job 936 submitted from the thread 922. In the example of FIG. 2, the database server 930 is saturated, making it difficult to quickly process the light job 936, which could otherwise be executed in a short time. The resulting long response time of the database server 930 is an example of the first factor of fluctuations mentioned above. That is, the light job 936 suffers interference from heavy jobs 933 to 935 running on the database server 930 and thus has to wait some extra time.

The two threads 931 and 932 on the database server 930 send a completion notice back to the requesting application server 920 when their respective jobs are finished. One thread 921 on the application server 920 receives a completion notice of a job 933, which permits submission of a new job 934 to the database server 930. The thread 921 further receives completion notices of jobs 934 and 935 and finishes its own job 923, thus sending a completion notice back to the web server 910. Similarly, the other thread 922 on the application server 920 receives a completion notice of a job 936 from the database server 930 and finishes its own job 924, thus sending a completion notice back to the web server 910.

On the web server 910, two threads 911 and 912 have been waiting for completion notices from their corresponding threads 921 and 922 on the application server 920. Upon receipt of such notices, the threads 911 and 912 finish their own jobs 913 and 914 and thus send a response back to the requesting user terminal devices to indicate completion of their processing requests.

As can be seen from the above example, the second thread 922 on the application server 920 delays its response because the submitted light job 936 is forced to spend more time in the database server 930 under the influence of heavy jobs 933 to 935. This slowdown of the thread 922 further delays response of the second thread 912 on the web server 910 because it is the thread 912 that has loaded the thread 922 with a job 924. The example of FIG. 2 demonstrates how the delay of one job 936 on the lowest tier propagates to upper tiers. Long response times of servers mean a long occupancy of connections, which could lead to exhaustion of resources in the connection pool. The lack of connection resources further causes threads to waste time in waiting for allocation of connections, thus worsening the response of servers. The result is a wild fluctuation of average response time of the multi-tier computer system, when viewed from terminal devices.

Figure 3:
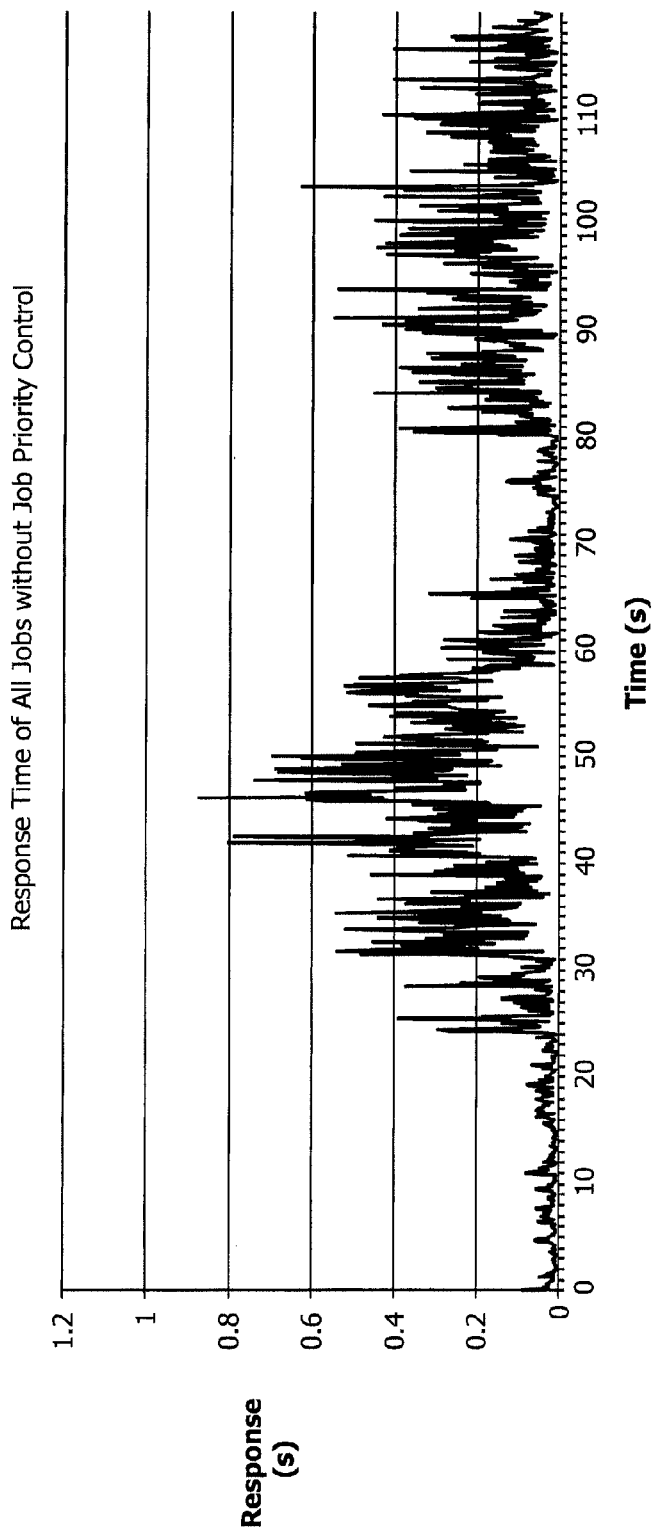
FIG. 3 is an exemplary graph illustrating temporal changes of average response time in the case where no job priority control is applied.

FIG. 3 is an exemplary graph illustrating temporal changes of average response time in the case where no job priority control is applied. This graph of FIG. 3 plots response time in the vertical axis, against the passage of time in the horizontal axis. Here each plotted value of response time is an average in a fine time granularity (e.g., time step size of 0.1 second). If the same measurements of response time are averaged with a coarse time granularity (e.g., one second), the resulting plot would be a moderate curve with no indication of server saturation. The use of a fine granularity reveals the presence of wild fluctuations of response time as seen in the graph of FIG. 3.

There are several techniques for alleviating fluctuations of response time. For example, the following section will discuss three techniques for reference. These techniques may solve the problem to some extent, but they have their own drawbacks as will be clarified below.

Figure 4:
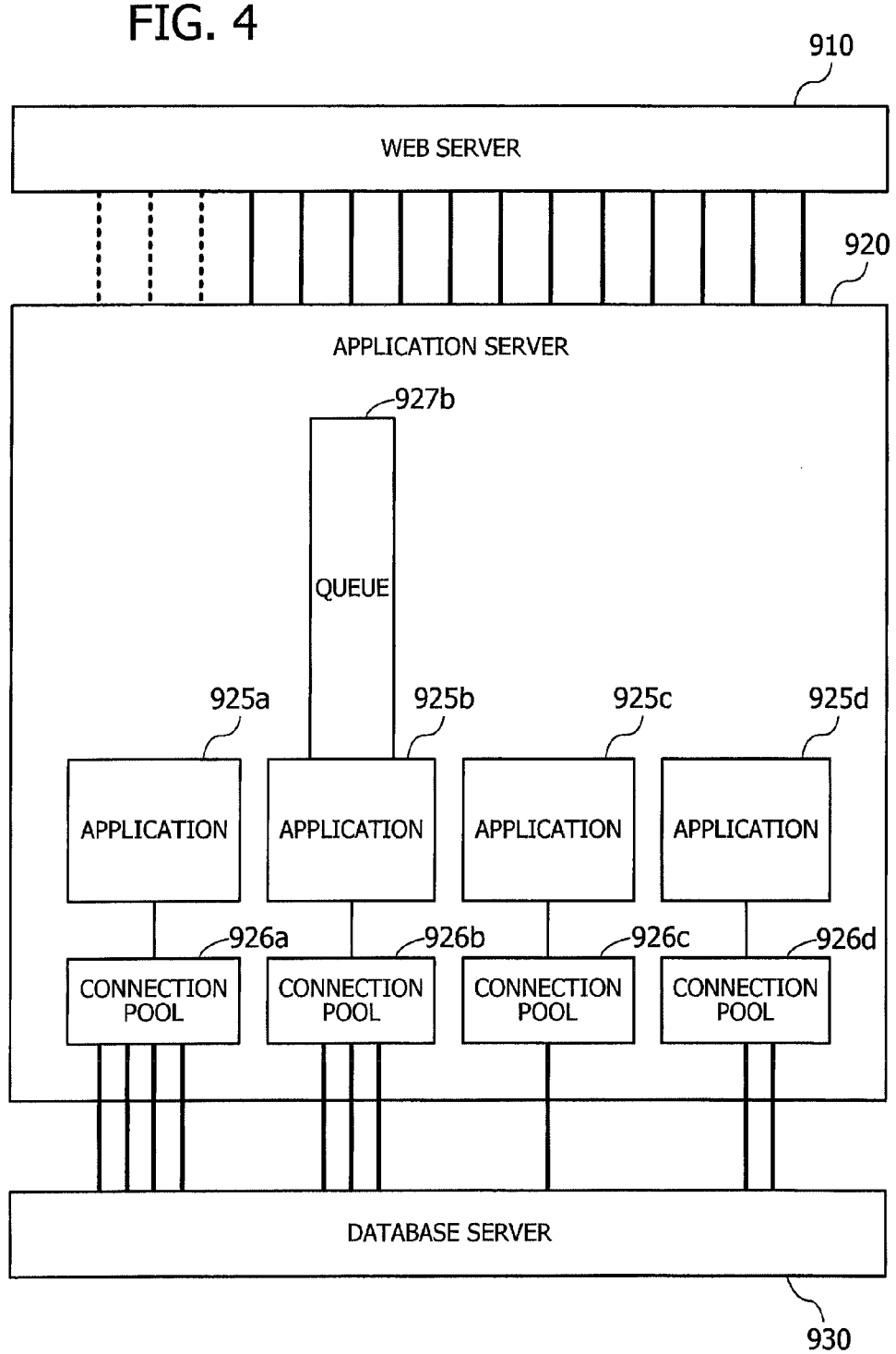
FIG. 4 illustrates a first technique for reference.

FIG. 4 illustrates a first technique for reference. This first technique uses static parameters to optimize the ratio of jobs submitted from one server to another server, for each category of jobs. In the example of FIG. 4, an application server 920 submits jobs to a lower-tier server that is approaching its performance limit. Specifically, applications 925a, 925b, 925c, and 925d on the application server 920 have different categories of jobs to submit to a database server 930. These applications 925a, 925b, 925c, and 925d are associated with different connection pools 926a, 926b, 926c, and 926d, respectively. When submitting a new job, the application 925a, 925b, 925c, and 925d receive allocation of a connection from those corresponding connection pools so that the job request can be delivered over the allocated connection. According to the first technique, each of the applications 925a, 925b, 925c, and 925d has a static parameter that specifies an optimal ratio of how many of their jobs are to be sent to the database server 930. The connection pools 926a, 926b, 926c, and 926d thus provide as many connections as determined according to the ratio of jobs that will be sent from each corresponding application.

The above-noted first technique has two drawbacks described below. The first drawback is that the static (or fixed) submission ratio of jobs does not work as intended unless a special control mechanism is employed to regulate the ratio of different categories of jobs. With no particular control, the ratio of different job categories may actually vary at minute intervals in a dynamic fashion. The first technique is, however, unable to feed a sufficient quantity of jobs to lower tiers even when a certain amount of headroom is available in their processing performance. Referring to the case of FIG. 4, the applications 925a, 925b, 925c, and 925d may be configured to submit their jobs at the ratio of 4:3:1:2, for example. When the second application 925b submits more jobs than expected, a long queue 927b of jobs builds up at that application 925b as seen in FIG. 4, despite the presence of performance headroom in the database server 930.

The second drawback is that neither the first factor nor the second factor of response-time fluctuations discussed above can be overcome by the proposed use of static job submission ratios. Because the job submission ratio of applications is given by a fixed parameter, and because the receiving tier is nearing its performance limitation, pending jobs will queue up in the sending tier as soon as the receiving tier is saturated. Even if one pending heavy job is finished, it would not help at all because the sender may produce another heavy job before long. The execution of such heavy jobs affects other jobs, thus resulting in a delayed response of light jobs.

Figure 5:
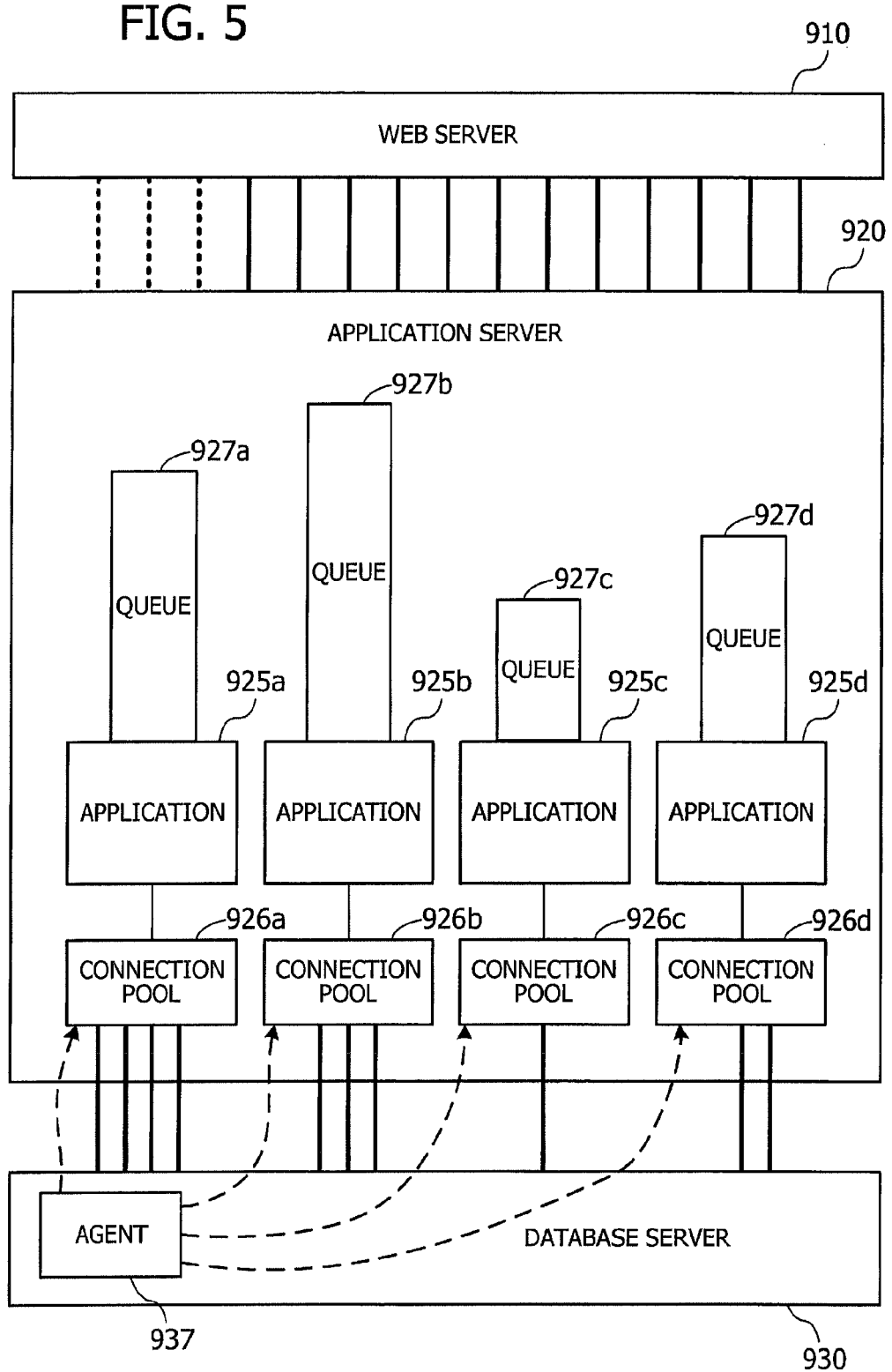
FIG. 5 illustrates a second technique for reference.

FIG. 5 illustrates a second technique for reference. This second technique introduces dynamic control of job volumes from an upper tier according to the saturation level of computing resources. Specifically, the second technique enables the sending tier (i.e., upper tier that sends jobs) to change the quantity or ratio of jobs, depending on the actual saturation level of the receiving tier that is nearing its performance limitation. To this end, an agent 937 is placed in the database server 930 to send information about its performance saturation to the application server 920, as depicted by the broken arrows in FIG. 5. The application server 920 changes the ratio of jobs submitted from applications 925a, 925b, 925c, and 925d, according to the received information on the actual saturation level of the database server 930. This change in the job submission ratio results in a variation in the number of connections allocated from connection pools 926a, 926b, 926c, and 926d. The second technique has the potential of resolving the foregoing first and second factors of fluctuations because the job submission ratio can be optimized dynamically.

It is noted, however, that the second technique uses a computer-to-computer communication link to deliver the saturation status information from one tier to another tier in the multi-tier system, so that the latter tier can control its job requests when the former tier is on the verge of saturation. Because of a time lag of this communication link, the saturation status information does not reach in a timely manner, making it difficult for the dynamic job submission control in the latter tier to deal effectively with instantaneous saturation in the former tier. Referring to the example of FIG. 5, the applications 925a, 925b, 925c, and 925d running on the application server 920 have many pending jobs for submission to the database server 930. Instantaneous saturation of the database server 930, however, induces the growth of job queues 927a, 927b, 927c, and 927d in the application server 920.

Figure 6:
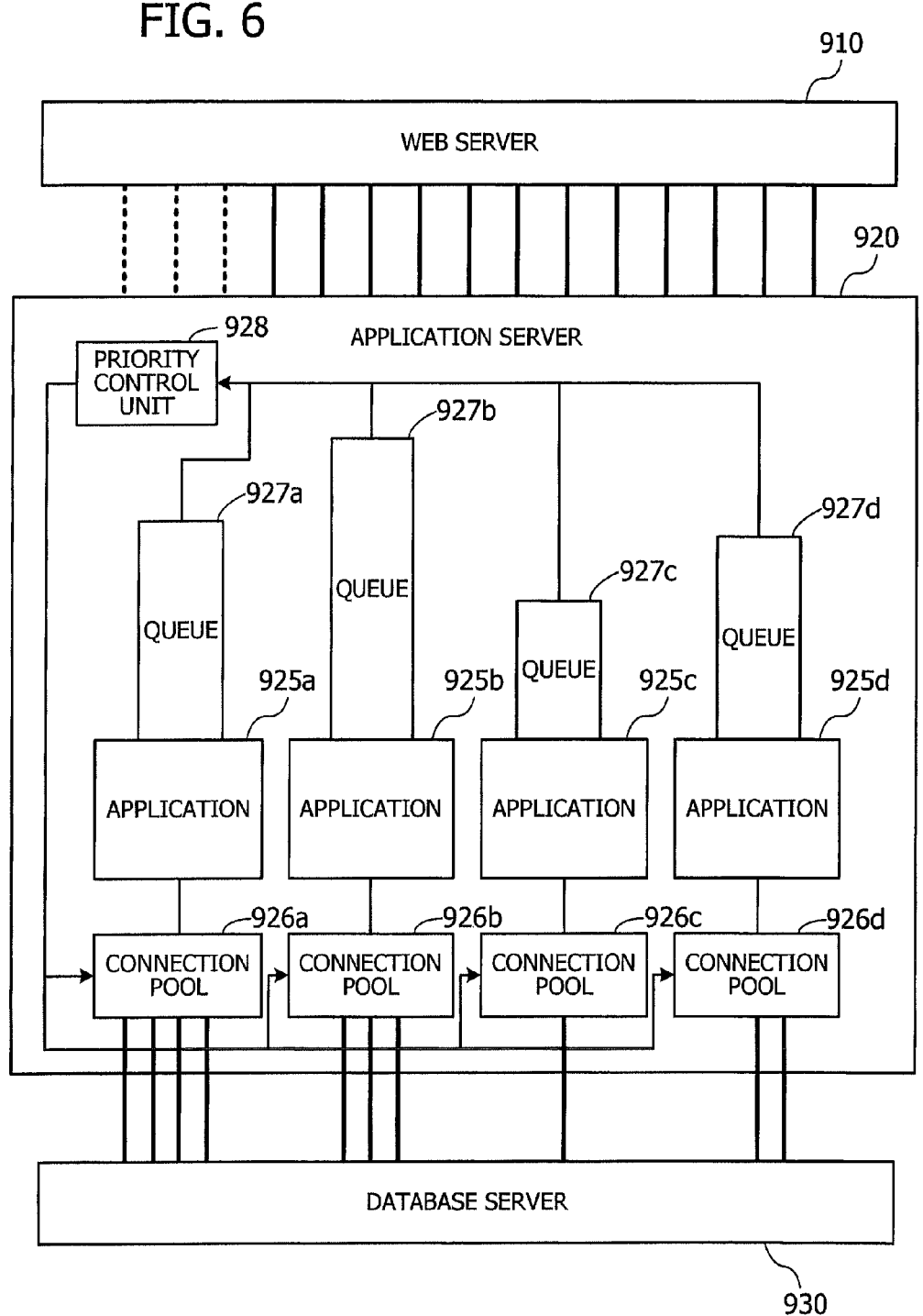
FIG. 6 illustrates a third technique for reference.

FIG. 6 illustrates a third technique for reference. This third technique controls priority of job submission according to the lengths of job queues. According to the third technique, the application server 920 has a priority control unit 928 to estimate the performance saturation status of a database server 930. The priority control unit 928 performs this estimation based on the length of each job queue 927a, 927b, 927c, and 927d, when the application server 920 sends jobs to the database server 930. Depending on the estimated saturation status of the database server 930, the priority control unit 928 dynamically changes the quantity and ratio of jobs that are submitted from applications 925a, 925b, 925c, and 925d.

This third technique is an attempt to solve the drawback of the second technique, i.e., the lack of timeliness of its dynamic job submission control due to a time lag of saturation status information transferred from tier to tier. The third technique offers different job submission ratios depending on the level of performance saturation of a tier and may thus be capable of optimizing the submission of jobs. The third technique, however, still has a shortcoming described below.

When an unusual buildup of queues is observed, the tier in question may have already been saturated. Starting dynamic job control at that moment would be of no help to the present saturation. Pending jobs have to wait for a while until the present saturation is resolved. In the case where the tier in question is occupied with heavy jobs at the moment, light jobs are just kept waiting in the sending tier until the heavy jobs are finished. This situation invites the foregoing first factor of response time fluctuations.

As will be described in detail below, the second embodiment offers more effective priority control by quickly detecting a sign of instantaneous saturation of a lower-tier server. This detection is performed by an upper-tier server that submits jobs to the lower-tier server. The second embodiment prevents light jobs from being influenced by the progress of heavy jobs, and thus avoids increase of average response time. The second embodiment also prevents upper-tier servers from wasting their computing resources. More specifically, dynamic priority control of light and heavy jobs is started in the sending tier by detecting a near-saturated state of the receiving tier, before long job queues build up as a result of full saturation. By doing so, the sending tier avoids unacceptable increase of system response time due to the first factor of fluctuations, i.e., the influence of progress of heavy jobs. Avoiding the first factor nullifies the second factor as well, because the latter is a consequence of the former. The following sections will provide more details of the second embodiment.

Figure 7:
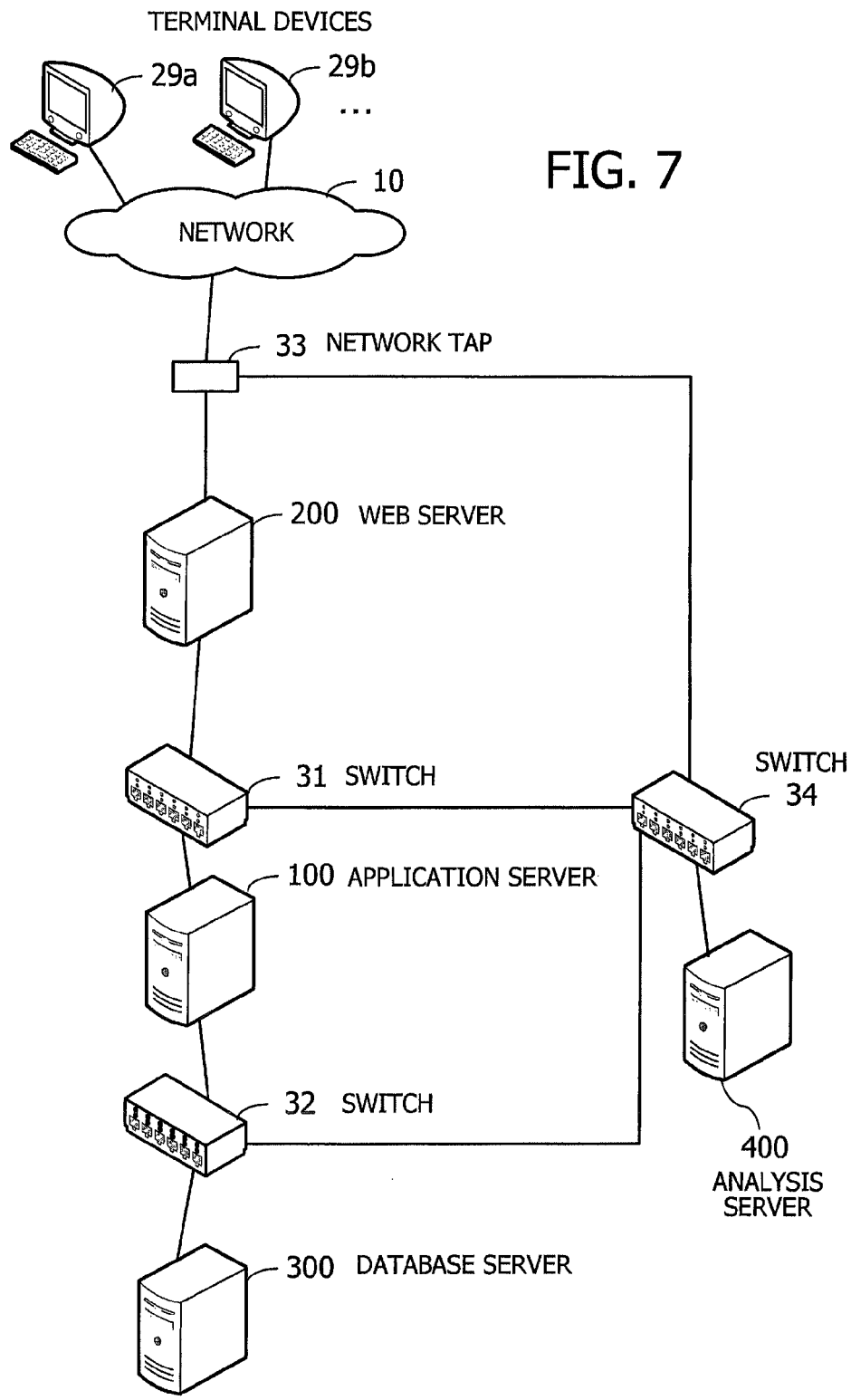
FIG. 7 illustrates an overall structure of a system according to a second embodiment.

FIG. 7 illustrates an overall structure of a system according to the second embodiment. The illustrated system is formed from an analysis server 400, a web server 200, an application server 100, and a database server 300. The web server 200 and application server 100 are linked to each other via a switch 31. Similarly the application server 100 and database server 300 are linked to each other via another switch 32.

Two switches 31 and 32 (referred to as first and second switches) seen on the left half of FIG. 7 have a port mirroring function, and their respective mirroring ports are linked to another switch 34 (third switch). More specifically, the mirroring port on the first switch 31 is used to send the third switch 34 a copy of packets transmitted between the web server 200 and application server 100. Similarly the mirroring port on the second switch 32 sends the third switch 34 a copy of packets transmitted between the application server 100 and database server 300.

A network tap 33 is inserted between the web server 200 and network 10, and its monitor port is connected to the third switch 34. The third switch 34 thus receives a copy of packets transmitted between the web server 200 and network 10. Also connected to the third switch 34 is an analysis server 400. The third switch 34 forwards packets from the first and second switches 31 and 32, as well as from the network tap 33, to this analysis server 400.

Terminal devices 29a, 29b, . . . are attached to network 10 to make access the web server 200. The users of those terminal devices 29a, 29b, . . . interact with the multi-tier system via a graphical user interface (GUI) provided by the web server 200.

The analysis server 400 manages operations of the web server 200, application server 100, and database server 300. To this end, the analysis server 400 collects information about these servers via the third switch 34. That is, the analysis server 400 performs packet capturing by receiving network packets from the switch 34 and storing their data in its local storage. The captured packet data is then subjected to a saturation analysis to check whether any server is experiencing performance saturation. This analysis is directed to the tiers of servers other than the topmost tier of the system (i.e., other than the web server 200 in the illustrated web three-tier system). When a saturated server is detected in a specific tier, the analysis server 400 issues a command to a server immediately above the saturated server to enable (activate) the job priority control in that upper-tier server.

The web server 200 accepts processing request messages addressed from web browsers running on the terminal devices 29a, 29b, . . . to the three-tier system. It is assumed here that the web server 200 and terminal devices 29a, 29b, . . . communicate their messages by using the HyperText Transfer Protocol (HTTP).

The received processing requests may be directed to either static content or dynamic content. In the case of static content, the web server 200 directly responds to each such request by producing an HTTP response and sending it back to the requesting terminal device. In the case of dynamic content, the web server 200 generates a request message that specifies a particular processing operation (job) and transmits the produced message to the application server 100. It is assumed that the web server 200 and application server 100 exchange such messages by using, for example, the Internet Inter-ORB Protocol (IIOP), where ORB stands for "Object Request Broker." The application server 100 executes the requested job and returns a response to the web server 200. Upon receipt of this response, the web server 200 produces a response message according to what is contained in the received response. The web server 200 then sends the produced response message to the requesting terminal device 29a, 29b, . . . over the network 10.

In the course of parsing the received message from the web server 200, the application server 100 may find something that needs help from a database server 300. When this is the case, the application server 100 produces a query that describes a specific processing operation or job. The produced query is transmitted to the database server 300. More specifically, this query is expressed in the form of Structured Query Language (SQL) statements. The application server 100 sends such statements to the database server 300 by using a proprietary protocol of the database server 300. The database server 300 returns a response to the application server 100 when the query is processed. Based on this response, the application server 100 continues its own work and sends a response message back to the web server 200.

The database server 300 executes SQL statements contained in the query received from the application server 100, making access to a database for data retrieval and update operations. Based on the result of this database access, the database server 300 creates a response and sends it back to the application server 100.

In the rest of this description, the term "servers" may be used (where appropriate) to collectively refer to the above web server 200, application server 100, and database server 300. In the multi-tier hierarchy, the web server 200 resides in the topmost tier, and the application server 100 and database server 300 in the second and third tiers.

Figure 8:
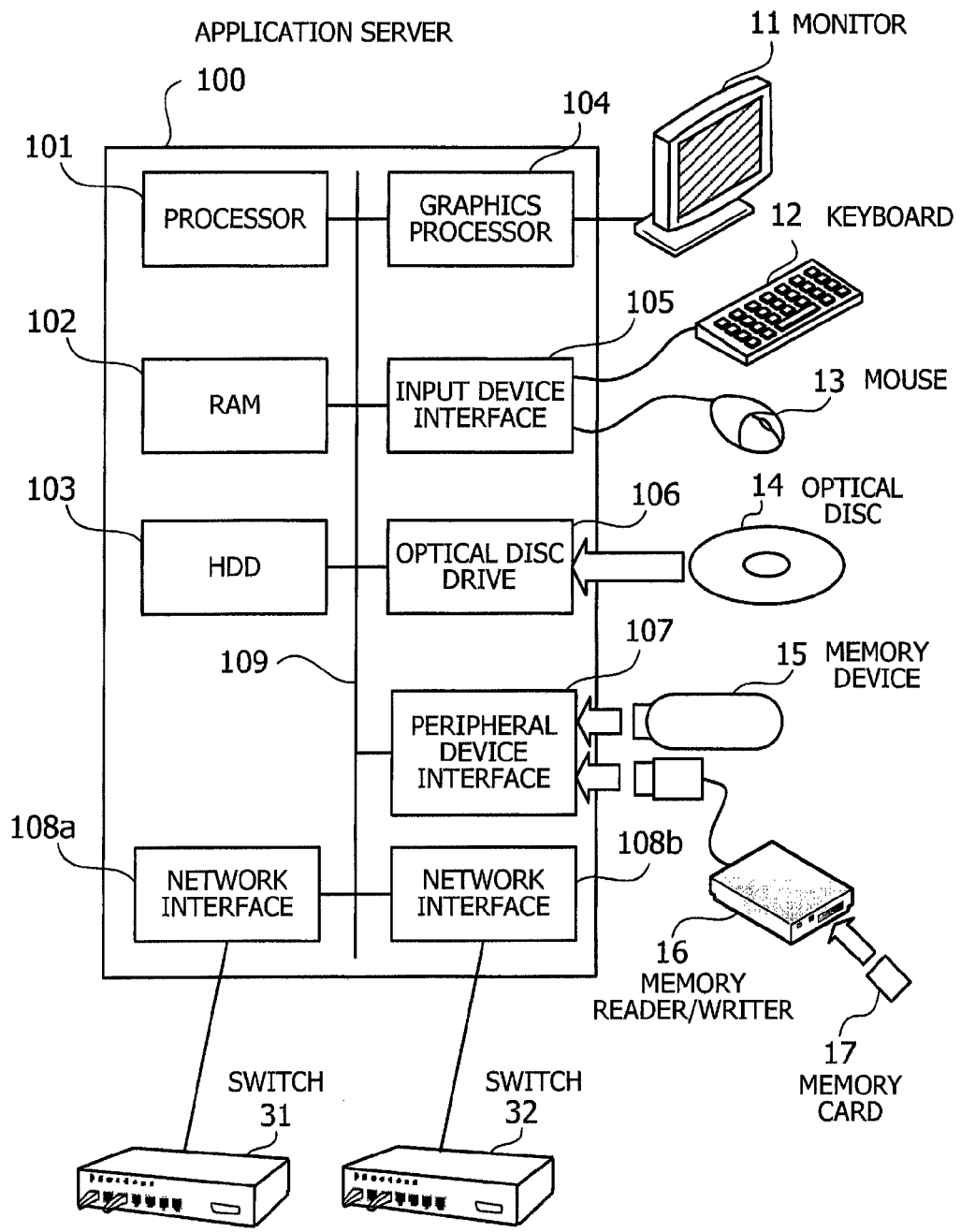
FIG. 8 illustrates an exemplary hardware configuration of an application server used in the second embodiment.

FIG. 8 illustrates an exemplary hardware configuration of an application server used in the second embodiment. The illustrated application server 100 has a processor 101 to control its entire operation. This processor 101 may be, for example, a central processing unit (CPU), microprocessor (MPU), digital signal processor (DSP), application-specific integrated circuit (ASIC), programmable logic device (PLD), or other processing device, or their combinations. The person skilled in the art would appreciate that the term "processor" may refer not only to a single processing device, but also to a multiprocessor system including two or more processing devices noted above.

The processor 101 is connected to a random access memory (RAM) 102 and other various devices and interface circuits on a bus 109. The RAM 102 serves as primary storage of the application server 100. Specifically, the RAM 102 is used to temporarily store at least some of the operating system (OS) programs and application programs that the processor 101 executes, in addition to various data objects that it manipulates at runtime.

Other devices on the bus 109 include a hard disk drive (HDD) 103, a graphics processor 104, an input device interface 105, an optical disc drive 106, and a peripheral device interface 107, and network interfaces 108a and 108b. The HDD 103 serves as secondary storage of the application server 100, which allows data to be written and read magnetically on its internal platters. The HDD 103 stores program and data files of the operating system and applications. Flash memory and other semiconductor memory devices may also be used as secondary storage, similarly to the HDD 103.

The graphics processor 104, coupled to a monitor 11, produces video images in accordance with drawing commands from the processor 101 and displays them on a screen of the monitor 11. The monitor 11 may be, for example, a cathode ray tube (CRT) display or a liquid crystal display.

The input device interface 105 is used to connect input devices such as a keyboard 12 and a mouse 13. The input device interface 105 supplies signals from those devices to the processor 101. The mouse 13 is a pointing device, which may be replaced with other kind of pointing devices such as touchscreen, tablet, touchpad, and trackball.

The optical disc drive 106 reads out data encoded on an optical disc 14, by using laser light. The optical disc 14 is a portable data storage medium, the data recorded on which can be read as a reflection of light or the lack of the same. The optical disc 14 may be a digital versatile disc (DVD), DVD-RAM, compact disc read-only memory (CD-ROM), CD-Recordable (CD-R), or CD-Rewritable (CD-RW), for example.

The peripheral device interface 107 is a communication interface used to connect peripheral devices to the application server 100. For example, the peripheral device interface 107 may be used to connect a memory device 15 and a memory reader/writer 16. The memory device is a data storage medium with a capability of communication with the peripheral device interface 107. The memory reader/writer 16 is an adapter used to write data to or read data from a memory card 17, which is a data storage medium in the form of a small card.

The application server 100 has two network interfaces 108a and 108b. One network interface 108a is linked to a switch 31. Via this switch 31, the network interface 108a sends data to and receives data from the web server 200 and other computers (not illustrated). The other network interface 108b is linked to another switch 32. Via this switch 32, the network interface 108b sends data to and receives data from the database server 300 and other computers (not illustrated).

The above-described hardware platform of the application server 100 may be used to realize various processing functions of the second embodiment. While FIG. 8 provides hardware components of the application server 100, the same hardware configuration may also be applied to other servers, i.e., web server 200, database server 300, and analysis server 400. Further, the information processing apparatus 1 discussed in the first embodiment can be implemented similarly on the hardware platform illustrated in FIG. 8.

The application server 100 implements various processing functions of the second embodiment by executing programs stored in a computer-readable storage medium. Those programs describe what the application server 100 is supposed to do, and may be provided in various forms of storage media. For example, the programs may be stored in an HDD 103 of the application server 100. The processor 101 loads all or some of those programs into its local RAM 102 and executes them. The programs may also be provided in a portable storage medium such as an optical disc 14, memory device 15, and memory card 17. For example, the programs in a portable storage medium are installed in the HDD 103 under the control of the processor 101 before they can be executed. Where appropriate, the processor 101 may also execute programs read out of a portable storage medium, without installing them in its local storage.

Figure 9:
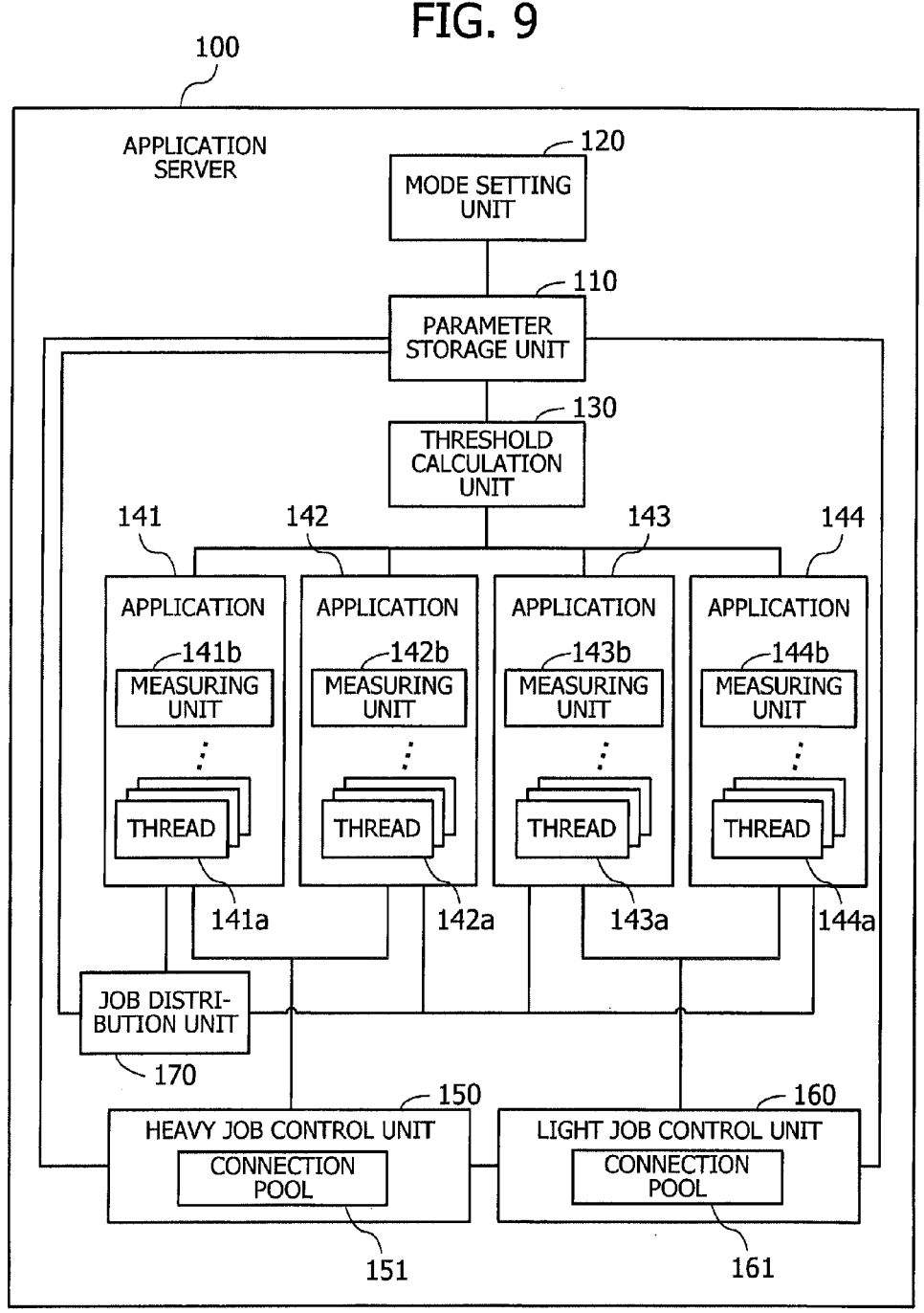
FIG. 9 is a block diagram illustrating an example of functions provided in an application server.

The application server 100 includes several components to implement the functions of job priority control. FIG. 9 is a block diagram illustrating an example of functions provided in the application server 100. The illustrated application server 100 includes a parameter storage unit 110, a mode setting unit 120, a threshold calculation unit 130, a plurality of applications 141, 142, 143, and 144, a plurality of job control units 150 and 160, and a job distribution unit 170.

The parameter storage unit 110 is where various parameters are stored for use in allocating connections to jobs. For example, the parameter storage unit 110 may be implemented as part of storage space of the RAM 102 or HDD 103.

The mode setting unit 120 manages a job priority control flag in the parameter storage unit 110, which indicates whether to execute job priority control or not. For example, the mode setting unit 120 receives a command specifying a change of on-off mode of job priority control from the analysis server 400. According to this command, the mode setting unit 120 changes the job priority control flag in the parameter storage unit 110. The mode setting unit 120 also manages a parameter N in the parameter storage unit 110, which represents the maximum number of jobs that the database server 300 is allowed to execute concurrently. This parameter N is an integer greater than zero. For example, the mode setting unit 120 receives the maximum number of concurrent jobs from the analysis server 400 and stores the received number as a parameter in the parameter storage unit 110.

The threshold calculation unit 130 calculates a threshold $\alpha$ for use in determining whether to allocate a connection to a thread that submits heavy jobs, where a is a real number in the range of $0<\alpha<N$. For example, the threshold calculation unit 130 permits the heavy-job thread to receive an allocation of connections if it is found that the database server 300 is executing light jobs that are fewer in number than the threshold $\alpha$.

The threshold calculation unit 130 calculates the above threshold $\alpha$ automatically from statistics collected from the past jobs. For example, the statistics used in this calculation may include the average processing time and occurrence rate of each job category in low workload conditions. Low-workload conditions of the database server 300 may be identified by, for example, detecting that the number of concurrently running jobs is smaller than a specific threshold. The second embodiment uses the term "processing time" to refer to the time that it takes for one thread to execute its jobs, from the beginning of its first job to the end of its last job. As the submission of a job in the second embodiment begins with allocation of a connection, the exact start point of job processing time is when the thread receives an allocation of a connection from the connection pool, and the exact end point is when the connection is deallocated, i.e., returned to the connection pool. The average processing time of a job category denotes the mean value of such processing times of jobs that belong to a particular category.

As an alternative to the above-described definition of processing time, the term "processing time" may only refer to the period during which the application server 100 waits for a response from the database server 300 to its job request, rather than the entire duration in which the connection is alive. In the case where a plurality of job requests are issued, the processing time means the sum of waiting times of all such requests. This alternative definition of processing time may represent the actual workload of the database server 300 more accurately. It is not intended, however, to suggest that the first-mentioned definition of processing time (i.e., the time from allocation to deallocation of a connection) is inaccurate. Rather, this processing time sufficiently reflects the degree of workload of the database server 300.

In association with the average processing time of a job category, the occurrence rate is calculated as the ratio of jobs in that particular category to the entire population of jobs (i.e., in all categories). These statistic values serve as the source data for calculation of the number of light jobs that are expected to be running concurrently on the database server 300 when the total number of concurrent jobs on the database server 300 reaches the foregoing maximum concurrent job count N. The threshold calculation unit 130 may use that expected number of light jobs as threshold $\alpha$. More specifically, the threshold calculation unit 130 multiplies the average processing time by the occurrence rate, for each different job category. Then the threshold calculation unit 130 adds up the products of all light job categories, as well as the products of all job categories, and divides the former sum by the latter sum. The threshold calculation unit 130 further multiplies the quotient of that division by the maximum concurrent job count N, thus obtaining threshold $\alpha$.

Suppose, for example, that the collected statistics include the following values for four different job categories A to D:

Job A (Light), Average Processing Time=5 ms, Occurrence Rate=0.30

Job B (Light), Average Processing Time=2 ms, Occurrence Rate=0.35

Job C (Heavy), Average Processing Time=20 ms, Occurrence Rate=0.20

Job D (Heavy), Average Processing Time=30 ms, Occurrence Rate=0.15

In the case where the maximum concurrent job count N is 6, threshold $\alpha$ is then calculated to be: $((5\times0.30+2\times0.35)/(5\times0.30+2\times0.35+20\times0.20+30\times0.15))\times6=1.23$.

This threshold $\alpha=1.23$ is used to determine whether to give priority to light jobs over heavy jobs. That is, light jobs are executed with higher priority when the number of ongoing light jobs has exceeded 1.23 (actually, when the integer number of light jobs has exceeded one or reached two), and this priority is maintained until the number of light jobs falls below the threshold.

The threshold calculation unit 130 may be configured to alter the threshold $\alpha$ dynamically. For example, the threshold calculation unit 130 may calculate a new threshold $\alpha$ at regular intervals by using the latest statistics of executed jobs, if available, and replace the current threshold with the new one. Such job statistics may be collected from applications 141 to 144 through their measurement functions (described later). It is also possible to configure the heavy and light job control units 150 and 160 to collect statistics of recent jobs.

Applications 141 to 144 are processing functions that are realized by application software. For example, each application 141, 142, 143 and 144 may be realized by executing a program called "servlet" on the processor 101. Take the leftmost application 141 seen in FIG. 9, for example. This application 141 executes jobs as requested from the web server 200. During the execution of a job, the application 141 may submit a new job to the database server 300 at its own discretion. When the result of that job is returned from the database server 300, the application 141 continues and finishes its own job assigned from the web server 200. Upon completion, the application 141 transmits the job result to the requesting web server 200. For example, the application 141 executes such jobs by launching a new thread 141a each time a new job processing request arrives from the web server 200 and assigning the requested job to that thread 141a.

The application server 100 has two job control units, and the application 141 is supposed to use one of them when submitting a new job to the database server 300. The choice of which one to use is made by the job distribution unit 170. When a need for database access arises, the thread 141a produces a job request for the database server 300, which may be a piece of information that specifies what database operations are requested. Then, to reach the database server 300, the thread 141a requests the chosen job control unit to allocate a connection. The application 141 thus obtains a connection for use in submitting the produced job to the database server 300.

The application 141 also includes a measuring unit 141b to measure the processing time, call count, and other statistics about each series of jobs submitted by threads of the application 141. Here the processing time of a series of jobs denotes, for example, the time from submission of the topmost job to completion of the last job in a series of jobs submitted from one thread. The call count denotes the number of jobs submitted from each thread to the database server 300. The measuring unit 141b measures those values and summarizes them for each different job category. For example, the measuring unit 141b provides the foregoing threshold calculation unit 130 with average processing time of each different job category based on the measurements.

Similarly to the above-described application 141, other applications 142, 143, and 144 also execute requested jobs with their respective threads 142a, 143a, and 144a. The job distribution unit 170 specifies which job control unit the applications 142, 143, and 144 are supposed to use when they submit jobs to the database server 300. Each thread 142a, 143a, and 144a submits jobs to the database server 300 via the specified job control unit. The applications 142, 143, and 144 also include measuring units 142b, 143b, and 144b, respectively. Those measuring units 142b, 143b, and 144b measure the processing time, call count, and other statistics about each series of jobs submitted by the threads of the applications 142, 143, and 144. The measuring units 142b, 143b, and 144b provide such statistical data, including average processing time, of each job category to the threshold calculation unit 130, similarly to the measuring unit 141b described above.

The application server 100 of FIG. 9 has two job control units 150 and 160 to control the number of jobs to be sent to the database server 300 for concurrent execution. According to the second embodiment, the heavy job control unit 150 controls the number of heavy jobs, while the light job control unit 160 controls the number of light jobs.

The heavy job control unit 150 includes a connection pool 151 to manage a set of connections previously established for the purpose of communication with the database server 300. The heavy job control unit 150 allocates connections from its local connection pool 151 to threads that submit heavy jobs to the database server 300. Here, the heavy job control unit 150 controls the total number of active connections so as not to exceed maximum concurrent job count N specified previously. When the job priority control is enabled, the heavy job control unit 150 controls submission of heavy jobs. More specifically, the heavy job control unit 150 suspends submission of heavy jobs to the database server 300 when the number of ongoing light jobs exceeds threshold $\alpha$, and there are pending light jobs to be submitted.

Similarly to the heavy job control unit 150 described above, the light job control unit 160 includes its own connection pool 161 to manage another set of connections previously established for communication with the database server 300. The light job control unit 160 allocates connections from its local connection pool 161 to threads that submit light jobs to the database server 300. Here, the light job control unit 160 controls the total number of active connections so as not to exceed the maximum concurrent job count N.

The job distribution unit 170 specifies which job control unit, 150 or 160, the applications 141 to 144 are supposed to use when they submit jobs to the database server 300. For example, this choice may be determined according to user input, for each individual application 141 to 144. Alternatively, the job distribution unit 170 may be designed to automate the choice of job control units for each application 141 to 144 in the way described below. Based on the statistics collected from executed jobs, the job distribution unit 170 estimates how much reduction in processing time is expected when different categories of jobs are distributed to the two job control units 150 and 160 in a particular combination. The job distribution unit 170 performs this estimation with various possible combinations and thus determines which combination provides the greatest reduction of processing time. The statistics used in this calculation include, for example, data of average processing time of each job category in low workload conditions. Also included are records indicating the number of jobs produced during a period of performance saturation. Here the second embodiment assumes that each application is dedicated for a particular category of jobs. In other words, all jobs submitted from one application fall in the same category.

For example, the job distribution unit 170 sorts the job categories in the order of their "heaviness" i.e., the length of average processing time with no waiting times involved. The job distribution unit 170 then divides the classified list of job categories into two groups at a certain point. One is a group of heavy job categories, and the other is a group of light job categories. By changing the dividing point, the job distribution unit 170 produces various grouping patterns of heavy job categories and light job categories.

Then for each produced grouping pattern, the job distribution unit 170 estimates an expected reduction of processing time. In this estimation, the reduction ratio may be represented as a ratio of m:1 (m is a real number greater than or equal to one) between the average processing time of heavy jobs and that of light jobs under low workload conditions of the database server 300. Now let n1 represent the number of heavy jobs, and n2 the number of light jobs, produced during a time period in which the database server 300 experiences performance saturation. The ratio of total processing time in worst scheduling versus total processing time in best scheduling is then calculated by using the following formula:

$$\text{Total Processing Time in Worst Scheduling} \quad (1)$$
$$\text{versus Total Processing Time in Best Scheduling} =$$
$$(m \cdot n_1! + m \cdot n_1 \cdot n_2 + n_2!):(n_2! + m \cdot n_1! + n_1 \cdot n_2) \doteq$$
$$\left(m \cdot \frac{n_1^2}{2} + m \cdot n_1 \cdot n_2 + \frac{n_2^2}{2}\right):\left(\frac{n_2^2}{2} + m \cdot \frac{n_1^2}{2} + n_1 \cdot n_2\right)$$

The job distribution unit 170 calculates the ratio of formula (1) for each produced grouping pattern and selects one of those grouping patterns that offers an "optimal" ratio of formula (1). A ratio of formula (1) is considered to be optimal when, for example, its reciprocal number (i.e., total processing time in best scheduling divided by that in worst scheduling) becomes minimum. According to the selected grouping pattern, the job distribution unit 170 then determines to which job control unit the applications are to send their connection allocation requests.

The above-noted reciprocal number may be interpreted as a reduction ratio of average processing time that is expected when the execution order of jobs is changed from that of the worst scheduling to that of the best scheduling. If this expected reduction ratio of average processing time is worse than a specified threshold (e.g., 0.7, or 70%), it suggests that job priority control would not be so effective. Accordingly, the job priority control mode may be turned off, even if the ratio of formula (1) is optimal, in the case where the expected reduction ratio of average processing time is greater than or equal to the specified threshold. Disabling job priority control when it is not effective alleviates workload of the application server 100.

It is noted that the lines interconnecting the functional blocks in FIG. 9 are only an example. The person skilled in the art would appreciate that there may be other communication paths in actual implementations. It is also noted that the threshold calculation unit 130 in FIG. 9 is an exemplary implementation of the calculation unit 1*e* discussed previously in FIG. 1 as part of the first embodiment. The applications 141 to 144 in FIG. 9 are an exemplary implementation of the execution units 1*a*-1, 1*a*-2, 1*a*-3, and 1*a*-4 discussed in the first embodiment. The heavy and light job control units 150 and 160 in FIG. 9 include functions of both the counting unit 1*f* and suspending unit 1*g* of the first embodiment. Further, the job distribution unit 170 in FIG. 9 is an exemplary implementation of the determination unit 1*b* of the first embodiment.

Figure 10:
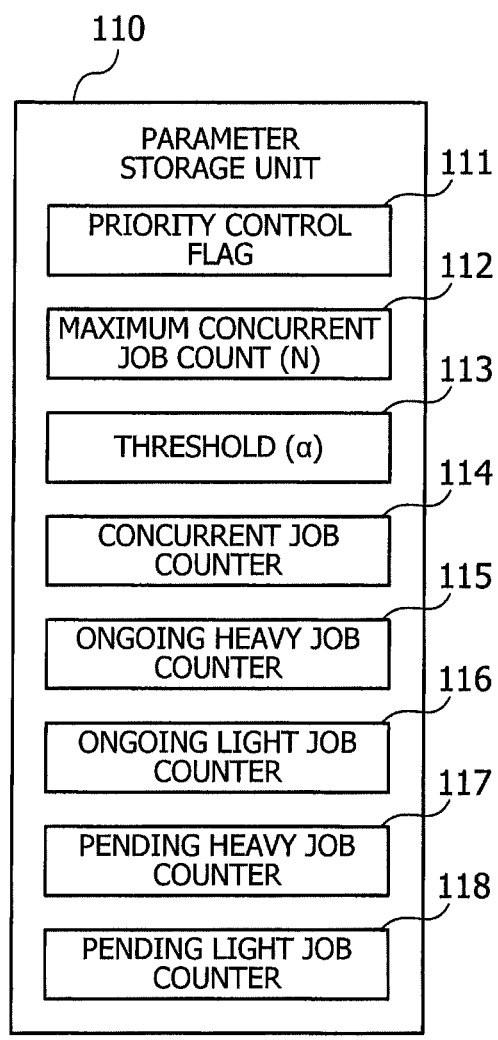
FIG. 10 illustrates an exemplary data structure of a parameter storage unit.

The details of parameters stored in the parameter storage unit 110 will now be described below. FIG. 10 illustrates an exemplary data structure of the parameter storage unit 110. The illustrated parameter storage unit 110 stores the following data objects: priority control flag 111, maximum concurrent job count 112, threshold 113, concurrent job counter 114, ongoing heavy job counter 115, ongoing light job counter 116, pending heavy job counter 117, and pending light job counter 118.

The priority control flag 111 represents the current on-off mode of job priority control. When, for example, job priority control is enabled (ON), the priority control flag 111 is set to one. When job priority control is disabled (OFF), the priority control flag 111 is cleared to zero.

The maximum concurrent job count 112 is a parameter that indicates the maximum number of jobs that the database server 300 is allowed to execute concurrently. The symbol "N" is used to refer to the value of this maximum concurrent job count 112.

The threshold 113 serves as a criterion for determining whether to allocate connections to heavy-job threads (i.e., threads that have at least one heavy job to submit to the database server 300) when the job priority control is enabled. The symbol "a" is used to refer to the value of this threshold 113.

The concurrent job counter 114 is a counter that indicates the number of jobs being executed concurrently on the database server 300. This concurrent job counter 114 is initialized to zero, and incremented by one each time a new job is submitted to the database server 300. The concurrent job counter 114 is decremented by one when a job is completed in the database server 300.

The ongoing heavy job counter 115 is a counter that indicates the number of heavy jobs being executed on the database server 300. This ongoing heavy job counter 115 is initialized to zero, and incremented by one each time a new heavy job is submitted to the database server 300. The ongoing heavy job counter 115 is decremented by one when a heavy job is completed in the database server 300.

The ongoing light job counter 116 is a counter that indicates the number of light jobs being executed on the database server 300. This ongoing light job counter 116 is initialized to zero, and incremented by one each time a new light job is submitted to the database server 300. The ongoing light job counter 116 is decremented by one when a light job is completed in the database server 300.

The pending heavy job counter 117 is a counter that indicates the number of heavy jobs waiting for submission to the database server 300. This pending heavy job counter 117 is initialized to zero, and incremented by one each time a thread having a heavy job for the database server 300 encounters suspension of connection allocation. The pending heavy job counter 117 is decremented by one each time a determination is made again about whether to allocate a connection for such a heavy-job thread requesting a connection.

The pending light job counter 118 is a counter that indicates the number of light jobs waiting for submission to the database server 300. This pending light job counter 118 is initialized to zero, and incremented by each time a thread having a light job for the database server 300 encounters suspension of connection allocation. The pending light job counter 118 is decremented by one each time a determination is made again about whether to allocate a connection for such a light-job thread requesting a connection.

Figure 11:
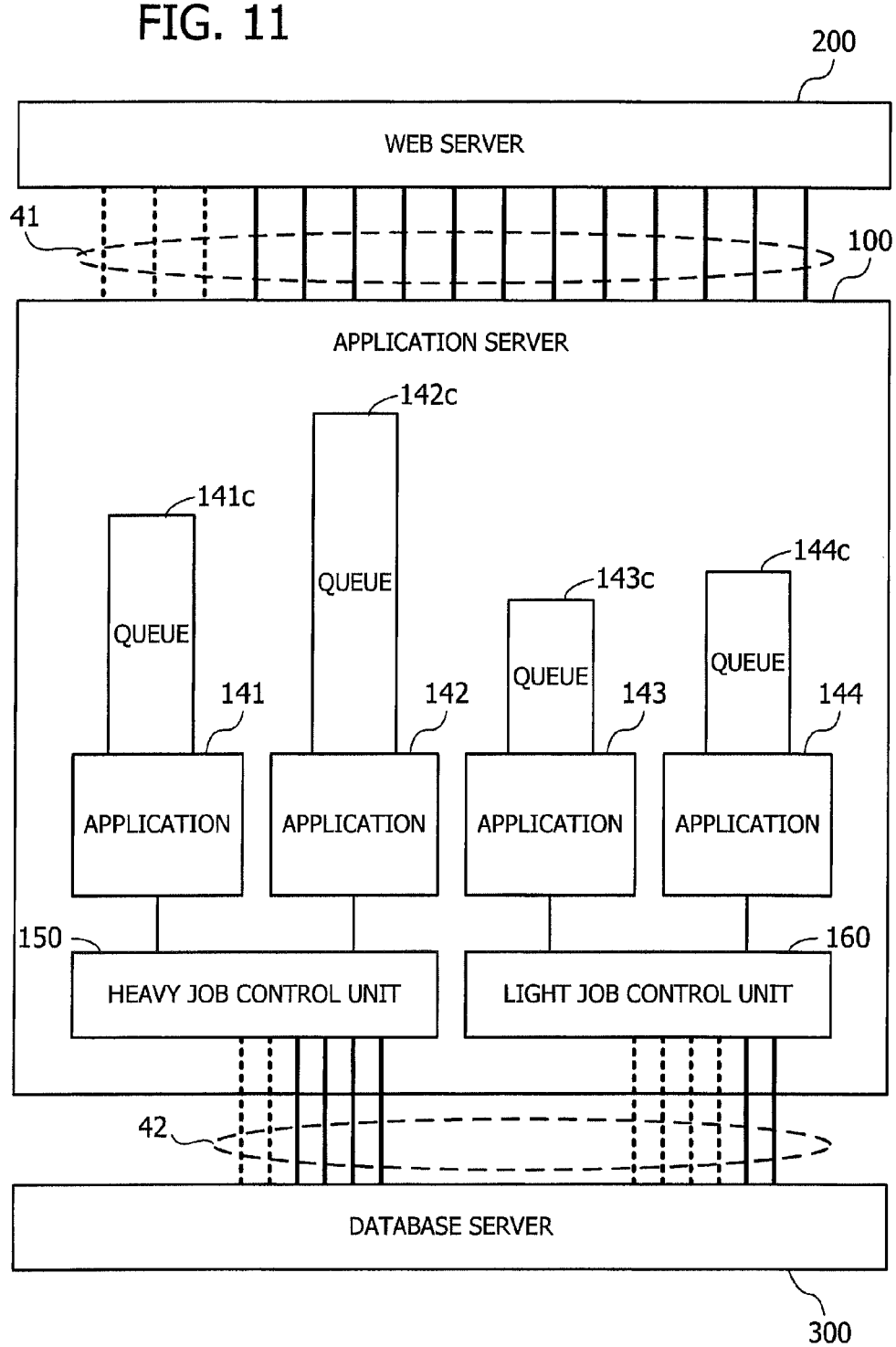
FIG. 11 illustrates an example of allocated connections.

Allocation of connections is controlled by using the above-described parameters in the parameter storage unit 110 of FIG. 10, so as to minimize the response time fluctuation of the database server 300. FIG. 11 illustrates an example of allocated connections. It is assumed in the example of FIG. 11 that two applications 141 and 142 submit heavy jobs to the database server 300, while another two applications 143 and 144 submit light jobs to the same. The former two applications 141 and 142 have been configured to send their connection allocation requests to the heavy job control unit 150, which is responsible for control of heavy jobs on the database server 300. The latter two applications 143 and 144, on the other hand, have been configured to send their connection allocation requests to the light job control unit 160, which is responsible for control of light jobs on the database server 300.

A plurality of connections 41 have been established between the web server 200 and application server 100. Similarly a plurality of connections 42 have been established between the application server 100 and database server 300. The heavy and light job control units 150 and 160 manage the latter set of connections in their respective connection pools 151 and 161 (not illustrated). FIG. 11 uses bold solid lines to indicate occupied connections, or active connections, and bold broken lines to represent unused connections.

The web server 200 submits a job to the application server 100 by using one of those connections 41, specifying which application is to execute it. In response, the application server 100 causes the specified application to execute the job.

When a job is given, the specified application 141 to 144 spawns a thread and causes that thread to execute the requested job. During execution of the job, the thread may need to interact with the database server 300. In that case, the thread produces a job for the database server 300 and sends a connection allocation request to the previously specified job control unit. For example, threads in the applications 141 and 142 send their connection allocation requests to the heavy job control unit 150 because they submit heavy jobs. Threads in the other applications 143 and 144, on the other hand, send their connection allocation requests to the light job control unit 160 because they submit light jobs.

In response to a connection allocation request from a thread, the receiving job control unit 150 or 160 allocates a connection to the requesting thread. The thread then uses the allocated connection to submit its job to the database server 300. The heavy and light job control units 150 and 160 may, however, suspend allocation of connections. In that case, the job of the thread is placed at the end of one of four queues 141c, 142c, 143c, and 144c corresponding to the applications 141, 142, 143, and 144. The first two queues 141c and 142c are managed by the heavy job control unit 150, and the second two queues 143c and 144c are managed by the light job control unit 160.

The web three-tier system described above provides services to the users. When the database server 300 is heavily loaded, its performance saturation could cause a wild fluctuation of response time of the system as a whole. The second embodiment activates job priority control to prevent such fluctuations from happening as will be described below.

Figure 12:
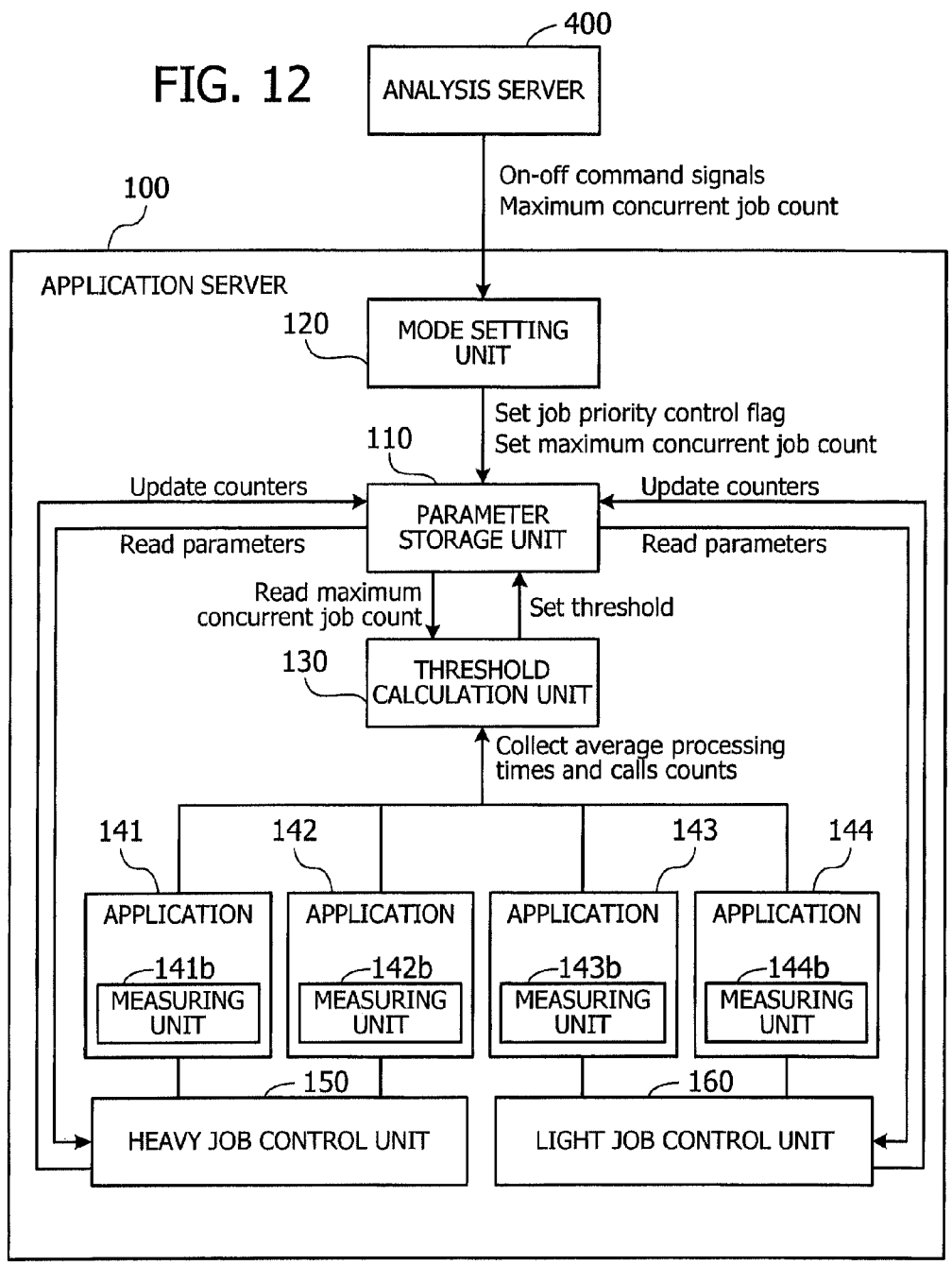
FIG. 12 gives an overview of processing operation in the application server according to the second embodiment.

FIG. 12 gives an overview of processing operation in the application server 100 according to the second embodiment. The job priority control is enabled or disabled by an on/off signal sent from the analysis server 400. For example, the analysis server 400 monitors the activity of each server by collecting a copy of packets exchanged among the servers. This monitoring is performed at short time intervals (e.g., 0.1 s). When one server is observed to be experiencing performance saturation in a certain monitoring period, the analysis server 400 sends a command signal to an upper-tier server associated with the saturated server to enable its job priority control. For example, when it is detected that the database server 300 is experiencing intermittent performance saturation, the analysis server 400 commands the application server 100 to enable its job priority control. The analysis server 400 also watches the saturated lower-tier server as to whether its saturation continues for a long time (i.e., the server falls into fully-saturated state), or whether the saturation has ceased (i.e., the server has returned to non-saturated state). Upon detection of a fully-saturated state or non-saturated state of the server in question, the analysis server 400 sends a command signal to the upper-tier server to disable its job priority control.

Each server accepts and executes a plurality of jobs concurrently. The number of such concurrent jobs is referred to herein as the "load" of a server. The analysis server 400 determines saturation of this "load" in the database server 300, based on the relationship between the load and response time per job, and sends a command signal to turn on or off the job priority control accordingly. For example, the analysis server 400 subdivides an observation period into a plurality of time windows and calculates an average load of jobs executed in each time window (unit time period), as well as a total progress quantity in that time window. The analysis server 400 then analyzes the relationship between load values and total progress quantities, thereby finding a particular load value above which the total progress quantity does not increase in spite of an increase of the load. The found load value is referred to as a "saturation point." This saturation point is where the server in question reaches its performance limit.

The analysis server 400 has a first threshold to compare with the ratio of time windows whose load values equal or exceed the saturation point. If the ratio of such time windows is greater than the first threshold, the analysis server 400 determines that the server is in a partially-saturated state. When this is the case, the analysis server 400 then turns to an upper-tier server located above the partially saturated server and issues a command signal to request that upper-tier server to enable its job priority control.

The analysis server 400 also has a second threshold to compare with the ratio of time windows whose load values equal or exceed the saturation point. This second threshold is higher than the first threshold, and if the ratio of such time windows is greater than the second threshold, the analysis server 400 determines that the server in question is in a fully-saturated state. When this is the case, the analysis server 400 issues a command signal to request that upper-tier server to disable its job priority control.

The analysis server 400 further has a third threshold to compare with the ratio of time windows whose load values equal or exceed the saturation point. This third threshold is lower than the first threshold, and if the ratio of such time windows is smaller than the third threshold, the analysis server 400 determines that the server in question is in a non-saturated state. When this is the case, the analysis server 400 issues a command signal to request the upper-tier server to disable its job priority control.

The analysis server 400 also informs the application server 100 of maximum concurrent job count N, which specifies how many jobs can be executed concurrently on the database server 300. For example, this maximum concurrent job count N have been determined in such a way that N is large enough to drive the server of a near-saturated tier into a fully saturated state, but not too large to cause unnecessary overhead.

More specifically, the analysis server 400 determines maximum concurrent job count N on the basis of, for example, the relationship between load of jobs executed on the database server 300 and the response time per job. For example, the analysis server 400 subdivides an observation period into a plurality of time windows and calculates an average load in each time window. The analysis server 400 extracts transactions whose response time in each time window falls within an acceptable time range. The analysis server 400 calculates a total progress quantity of the jobs that were executed by the database server 300 in the extracted transactions. The analysis server 400 seeks a boundary point of load at which the total progress quantity begins decreasing in spite of an increase in the load, and chooses that point as the maximum concurrent job count N. The threshold determined in this way serves as an upper bound of load limit parameters for ensuring that the response times of transactions fall within an acceptable range.

The load-based determination described above is only an example of how the job priority control is enabled and disabled. Other methods may be used to achieve the same purpose. This also holds true for the above-described determination of maximum concurrent job count N.

With the above-described command signals from the analysis server 400, the mode setting unit 120 in the receiving application server 100 changes the priority control flag 111 stored in the parameter storage unit 110, thus enabling or disabling job priority control. The mode setting unit 120 also receives a parameter of maximum concurrent job count N from the analysis server 400 and stores it in the parameter storage unit 110.

In the applications 141 to 144 running on the application server 100, their respective measuring units 141b, 142b, 143b, and 144b collect statistics of each series of jobs submitted to database server 300, including their average processing times and call counts (the number of submitted jobs). One thread may submit two or more jobs in series. The processing time in this case is measured as the time from the beginning of its first job to the end of its last job. Each measuring unit 141b, 142b, 143b, and 144b supplies such statistical records to the threshold calculation unit 130.

The threshold calculation unit 130 accumulates received statistics in the RAM 102 or HDD 103. The threshold calculation unit 130 calculates a threshold α automatically from the accumulated statistics, for use in dynamically changing job priorities. For example, the threshold calculation unit 130 performs this calculation on the basis of the average processing time and occurrence rate of each job category in low workload conditions. The heavy and light job control units 150 and 160 identify low-workload conditions by detecting that the number of concurrently running jobs is smaller than a specific threshold. The threshold calculation unit 130 now reads maximum concurrent job count N out of the parameter storage unit 110. The threshold calculation unit 130 estimates how many light jobs are included in this maximum concurrent job count N, based on the average processing time and occurrence rate of each job category. The calculated estimate is stored into the parameter storage unit 110 as the threshold α.

As described above, the threshold α is calculated as the expected number of light jobs included in maximum concurrent job count N. The reason for this calculation may be explained as follows. It is known that maximum concurrent job count N is large enough to drive a near-saturated tier into a fully saturated state. There is also an estimate of the ratio of concurrently executed jobs between heavy job group and light job group assigned to the heavy job control unit 150 and light job control unit 160, respectively. Accordingly, it would be safe to say that a tier is approaching its performance saturation when the number of light jobs exceeds the above-noted threshold α, even if the number of concurrently executed jobs including both heavy and light jobs has not reached N. The second embodiment is therefore designed to calculate threshold α as the expected number of light jobs included in maximum concurrent job count N and determine that a tier is approaching its performance saturation when the number of light jobs exceeds the threshold α.

The two job control units 150 and 160 control the priority of jobs for the database server 300 in a dynamic fashion by using various parameters discussed above. The next section will describe how the job priority control handles heavy jobs and light jobs, with reference to FIG. 13.

Figure 13:
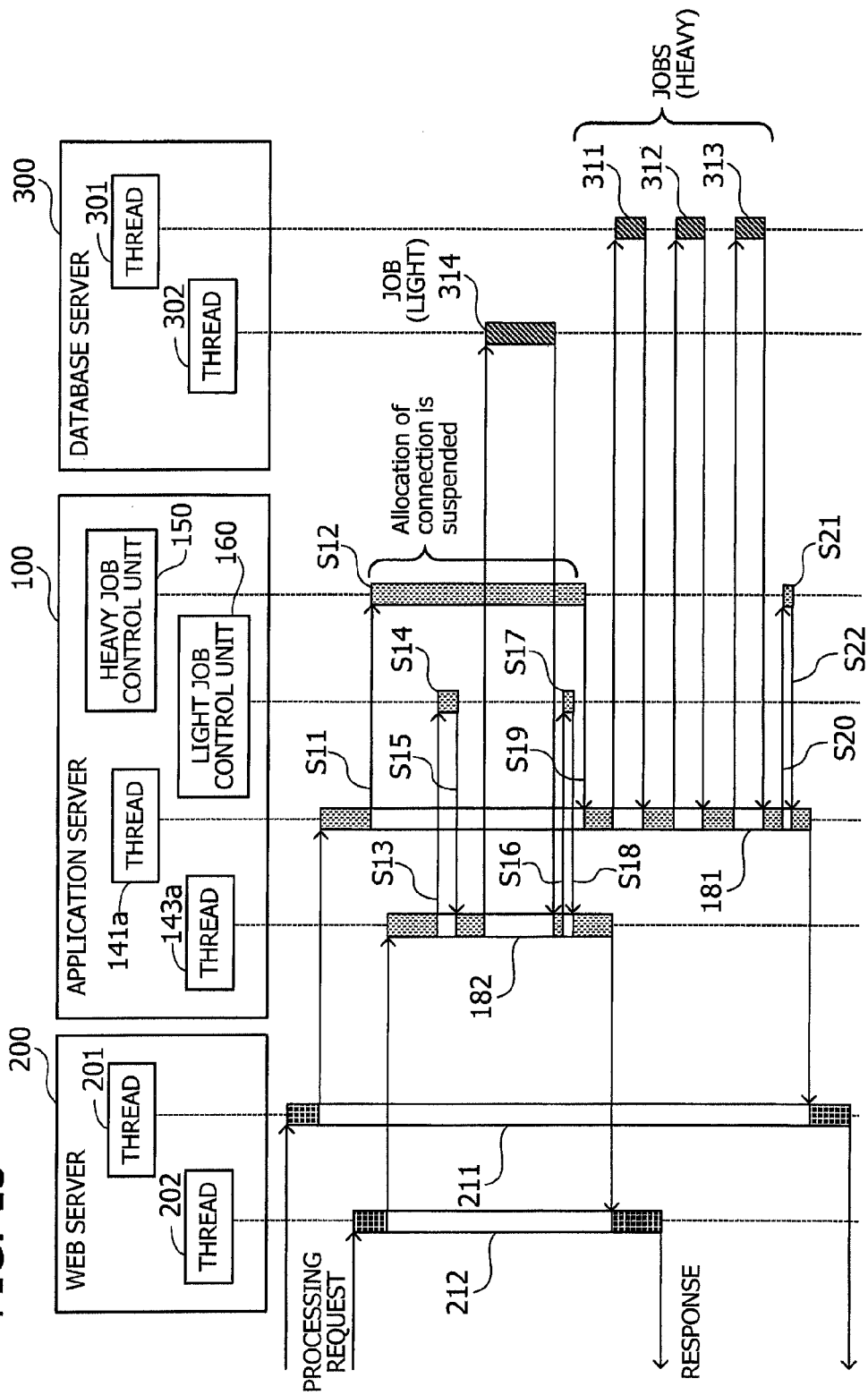
FIG. 13 illustrates an example of job priority control.

FIG. 13 illustrates an example of job priority control. As seen, two threads 201 and 202 have been produced on the web server 200 in response to two processing requests received from user terminal devices. These threads 201 and 202 execute their respective jobs 211 and 212 according to what is specified in the received processing requests. During the course of execution of jobs 211 and 212, the threads 201 and 202 may need some interactions with the application server 100. When this is the case, the threads 201 and 202 produce new jobs and submit them to the application server 100.

In response to the job submission from the web server 200, the application server 100 spawns two threads 141a and 143a. One thread 141a executes a job 181 submitted from the thread 201, while the other thread 143a executes a job 182 submitted from the thread 202. The former thread 141a submits three jobs to the database server 300 in the course of execution of the job 181. While individual jobs 311 to 313 do not necessarily need much time to finish, it takes a long time for the database server 300 to complete the whole series of those jobs, from the beginning of the first job 313 to the end of the third job 313. In the second embodiment, a plurality of jobs submitted in succession over the same connection are treated as if they were a single job, for the purpose of calculation of processing time. For this reason, the illustrated series of jobs 311 to 313 in FIG. 13 is taken as a single heavy job. Another thread 143a on the application server 100 submits only one job 314 to the database server 300. This job 314 is usually a light job that can be executed in a short time unless the performance of the database server 300 is saturated.

Suppose now that the priority control flag 111 is set to one (ON), meaning that the application server 100 is performing job priority control. It is also assumed that the application server 100 has some light jobs pending in the queue 143c (not illustrated in FIG. 13), and that the number of concurrent light jobs exceeds threshold α in the database server 300.

In the above-described situation of the three-tier system, one thread 141a executing its job 181 on the application server 100 needs to interact with database server 300. The thread 141a thus sends a connection allocation request to the heavy job control unit 150 (step S11). The heavy job control unit 150, however, suspends this connection allocation request because the job priority control is enabled, and there are pending light jobs in the queue 143c (step S12).

Another thread 143a on the application server 100 is executing a job 182, during which a need arises for interaction with the database server 300. The thread 143a thus sends a connection allocation request to the light job control unit 160 (step S13). In response, the light job control unit 160 allocates a connection to the requesting thread 143a since the total number of submitted jobs on the database server 300 is smaller than the maximum number of concurrent jobs N (step S14). The light job control unit 160 then sends a connection allocation completion notice to the requesting thread 143a (step S15). The thread 143a then submits a job 314 to the database server 300 by using the allocated connection. In response to this job submission, the database server 300 spawns a thread 302 to execute the submitted job 314. When this job 314 is finished, the thread 302 on the database server 300 sends a job completion notice back to the application server 100.

Upon receipt of the job completion notice from the database server 300, the thread 143a on the application server 100 sends a connection return notice to the light job control unit 160 (step S16). In response, the light job control unit 160 deallocates the connection from the thread 143a (step S17) and returns a connection deallocation notice to the thread 143a (step S18). This connection deallocation notice permits the thread 143a to continue the rest of its job 182. The thread 143a finally informs the web server 200 that the submitted job 182 is completed.

Afterwards, the heavy job control unit 150 allocates a connection to the thread 141a when the job priority control is disabled or when the queues 143c and 144c become empty of light jobs. The heavy job control unit 150 then sends a connection allocation completion notice to the requesting thread 141a. The thread 141a then submits three new jobs one by one to the database server 300 by using the allocated connection. In response to this job submission, the database server 300 spawns a thread 301 to execute the submitted jobs 311 to 313. When all the three jobs 311 to 313 are finished, the thread 301 on the database server 300 sends a job completion notice back to the application server 100.

Upon receipt of the job completion notice from the database server 300, the thread 141a on the application server 100 sends a connection return notice to the heavy job control unit 150 (step S20). In response to this connection return notice, the heavy job control unit 150 deallocates the connection from the thread 141a (step S21) and returns a connection deallocation notice to the thread 141a (step S22). This connection deallocation notice permits the thread 141a to continue the rest of its job 181. The thread 141a finally informs the web server 200 that the submitted job 181 is completed.

As can be seen from the above sequence, the second embodiment permits a thread to submit light jobs to the database server 300 in preference to heavy jobs during a time period in which the number of jobs submitted through the light job control unit 160 and running concurrently on the database server 300 exceeds threshold α. During that time period, the heavy job control unit 150 suspends submission of new heavy jobs, while allowing ongoing heavy jobs to continue and finish their execution. The proposed job scheduling of the second embodiment places light jobs before heavy jobs to prevent the light jobs from being forced to spend extra time under the influence of heavy jobs. This feature makes it possible to minimize the increase of response time of the three-tier system as a whole.

Figure 14:
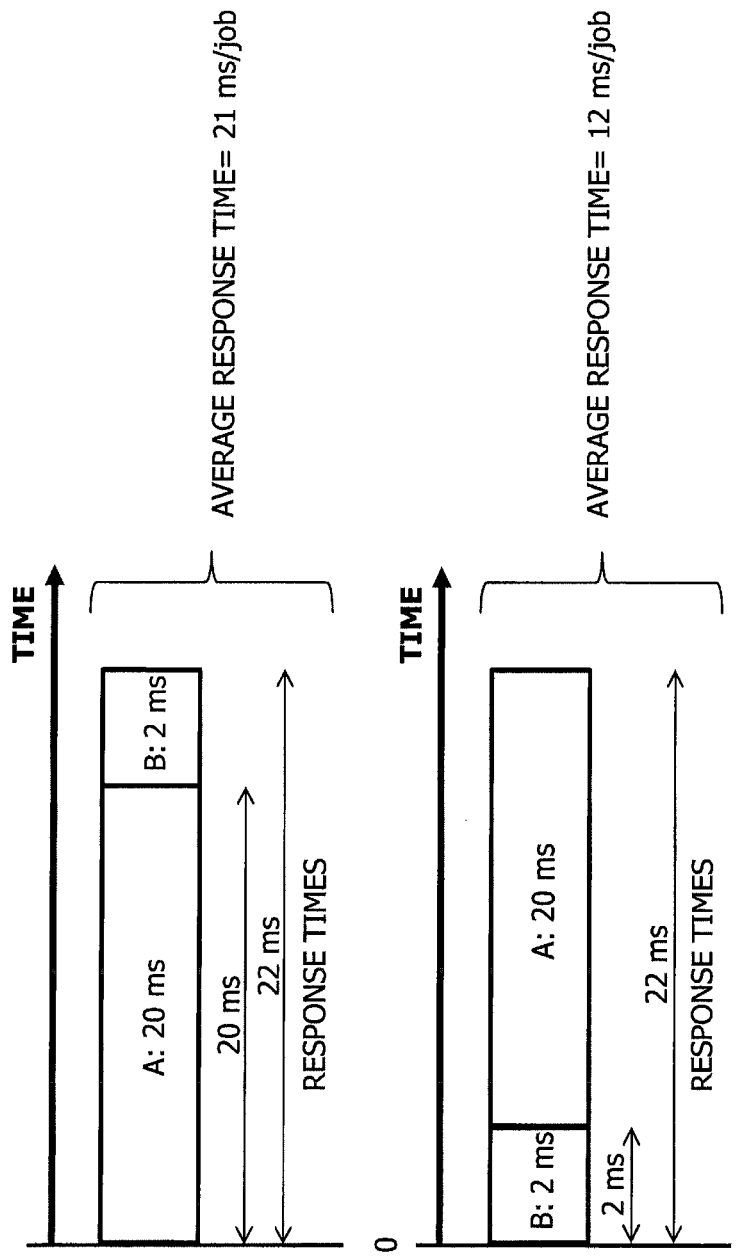
FIG. 14 illustrates an example of how the average response time changes depending on the execution order of jobs.

FIG. 14 illustrates an example of how the average response time changes depending on the execution order of jobs. This example assumes that a heavy job A with an execution time of 20 ms and a light job B with an execution time of 2 ms arrive at the same time. For simplicity purposes, the degree of parallelism is set to one in FIG. 14, meaning that the server is allowed to execute only one submitted job at a time.

The upper half of FIG. 4 illustrates the case in which heavy job A is submitted first. The response time of heavy job A in this case is 20 ms, while that of light job B is 22 ms. Their average response time is calculated to be 21 ms. In contrast, the lower half of FIG. 14 illustrates the case in which the light job B is submitted first. The response time of heavy job A in this case is 22 ms, while that of light job B is 2 ms. Their average response time is calculated to be 12 ms.

As can be seen from the above example, the prioritized execution of light jobs minimizes the increase of average response time even if the database server 300 falls into a partially saturated state. A reduced increase of response time means a reduced increase of concurrent jobs staying in the system. This also means that the system is saved from the risk of resource exhaustion in upper tiers and a consequent increase of response time. In other words, the foregoing second cause of fluctuations is eliminated.

It is noted that the second embodiment may permit submission of new heavy jobs even in a time period in which the number of light jobs concurrently executed under the control of the light job control unit 160 is greater than threshold α. This is, however, limited to the case in which the following two conditions are both true: (1) the total number of heavy and light jobs concurrently executed on the database server 300 is smaller than maximum concurrent job count N, and (2) no pending light jobs are present in the queues 143c and 144c. When the number of light jobs concurrently executed under the control of the light job control unit 160 falls below the threshold α, the system handles heavy jobs as in the initial state.

More detailed procedures of job priority control will now be described with reference to a few flowcharts. The description begins with a mode setting procedure executed by the mode setting unit 120.

Figure 15:
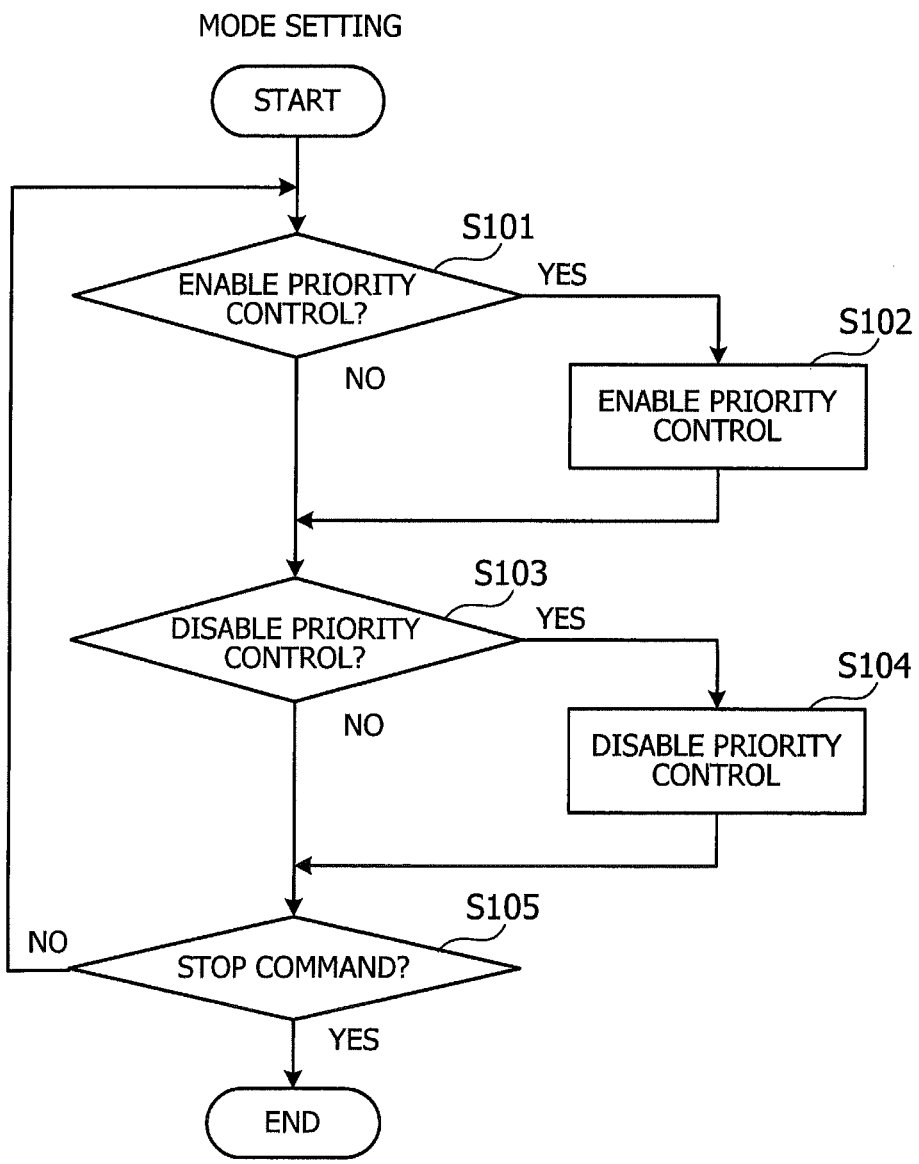
FIG. 15 is a flowchart illustrating an example of a mode setting procedure.

FIG. 15 is a flowchart illustrating an example of a mode setting procedure. Each step of FIG. 15 is described below in the order of step numbers.

(Step S101) The mode setting unit 120 determines whether a command signal is received from the analysis server 400 which commands the application server 100 to enable its job priority control. When such a command signal is received, the mode setting unit 120 proceeds to step S102. Otherwise, the mode setting unit 120 advances to step S103.

(Step S102) In response to the command signal, the mode setting unit 120 enables priority control mode. For example, the mode setting unit 120 gives a value of one to the priority control flag 111 in the parameter storage unit 110. The mode setting unit 120 then proceeds to step S103.

(Step S103) The mode setting unit 120 determines whether a command signal is received from the analysis server 400 which commands the application server 100 to disable its job priority control. When such a command signal is received, the mode setting unit 120 proceeds to step S104. Otherwise, the mode setting unit 120 advances to step S105.

(Step S104) In response to the command signal, the mode setting unit 120 disables priority control mode. For example, the mode setting unit 120 gives a value of zero to the priority control flag 111 in the parameter storage unit 110. The mode setting unit 120 then proceeds to step S105.

(Step S105) The mode setting unit 120 determines whether a stop command is received. When there is a stop command requesting to stop the mode setting procedure, the mode setting unit 120 terminates the mode setting process. Otherwise, the mode setting unit 120 goes back to step S101 and repeats the above steps.

As can be seen from the above steps, the second embodiment switches job priority control according to commands from the analysis server 400. The next section will describe how the heavy job control unit 150 controls job counts.

Figure 16:
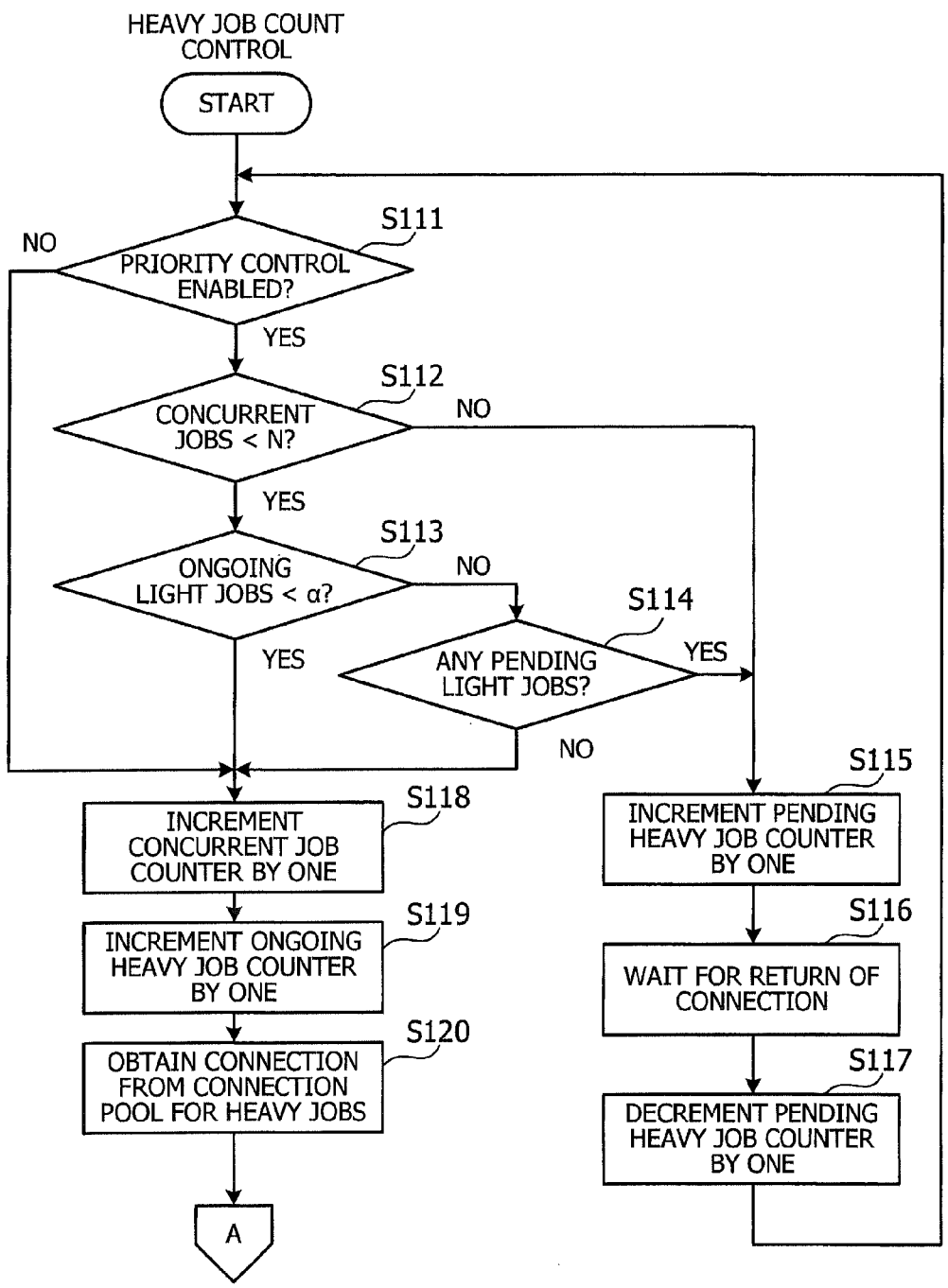
FIGS. 16 and 17 are first and second halves of a flowchart illustrating an exemplary procedure of heavy job count control.

FIG. 16 is the first half of a flowchart illustrating an exemplary procedure of heavy job count control. Each step of FIG. 16 is described below in the order of step numbers. This heavy job count control procedure is invoked when a connection allocation request from a thread in applications 141 and 142 arrives at the heavy job control unit 150. The following explanation assumes that one thread 141*a* has issued a connection allocation request.

(Step S111) The heavy job control unit 150 determines whether the job priority control is enabled. For example, the heavy job control unit 150 tests the priority control flag 111 in the parameter storage unit 110. If it is set to one, the heavy job control unit 150 determines that job priority control is enabled, and thus advances to step S112. If job priority control is disabled, the heavy job control unit 150 skips to step S118.

(Step S112) Since job priority control is enabled, the heavy job control unit 150 now determines whether the number of concurrent jobs (i.e., the total number of jobs being executed on the database server 300) is smaller than the maximum concurrent job count N in the parameter storage unit 110. Here the number of concurrent jobs is obtained by reading the concurrent job counter 114 in the parameter storage unit 110. If that number is smaller than N, the heavy job control unit 150 advances to step S113. Otherwise, the heavy job control unit 150 branches to step S115.

(Step S113) The heavy job control unit 150 determines whether the number of ongoing light jobs (i.e., the number of light jobs being executed on the database server 300) is smaller than threshold α stored in the parameter storage unit 110. The current number of ongoing light jobs is obtained by reading the ongoing light job counter 116 in the parameter storage unit 110. If this number is smaller than α, the heavy job control unit 150 advances to step S118. If current number of ongoing light jobs is greater than or equal to α, the heavy job control unit 150 proceeds to step S114.

(Step S114) The heavy job control unit 150 determines whether any light jobs are pending in queues 143*c* and 144*c* under the control of the light job control unit 160. For example, the heavy job control unit 150 identifies the presence of pending light jobs when the pending light job counter 118 in the parameter storage unit 110 indicates one or more such jobs. If there are pending light jobs, the heavy job control unit 150 proceeds to S115. If no pending jobs are found, the heavy job control unit 150 proceeds to S118.

(Step S115) The heavy job control unit 150 increments by one the pending heavy job counter 117 in the parameter storage unit 110.

(Step S116) The heavy job control unit 150 makes the thread 141*a* wait until a connection is returned to either of the connection pools 151 and 161.

(Step S117) When a connection is returned, the thread 141*a* is allowed to exit from the waiting state. The heavy job control unit 150 then decrements by one the pending heavy job counter 117 in the parameter storage unit 110 and then returns to S111.

(Step S118) The heavy job control unit 150 increments by one the concurrent job counter 114 in the parameter storage unit 110.

(Step S119) The heavy job control unit 150 increments by one the ongoing heavy job counter 115 in the parameter storage unit 110.

(Step S120) The heavy job control unit 150 takes out one connection from its connection pool 151 and allocates the connection to the requesting thread 141*a*. The heavy job control unit 150 now moves to step S131 (FIG. 17).

Figure 17:
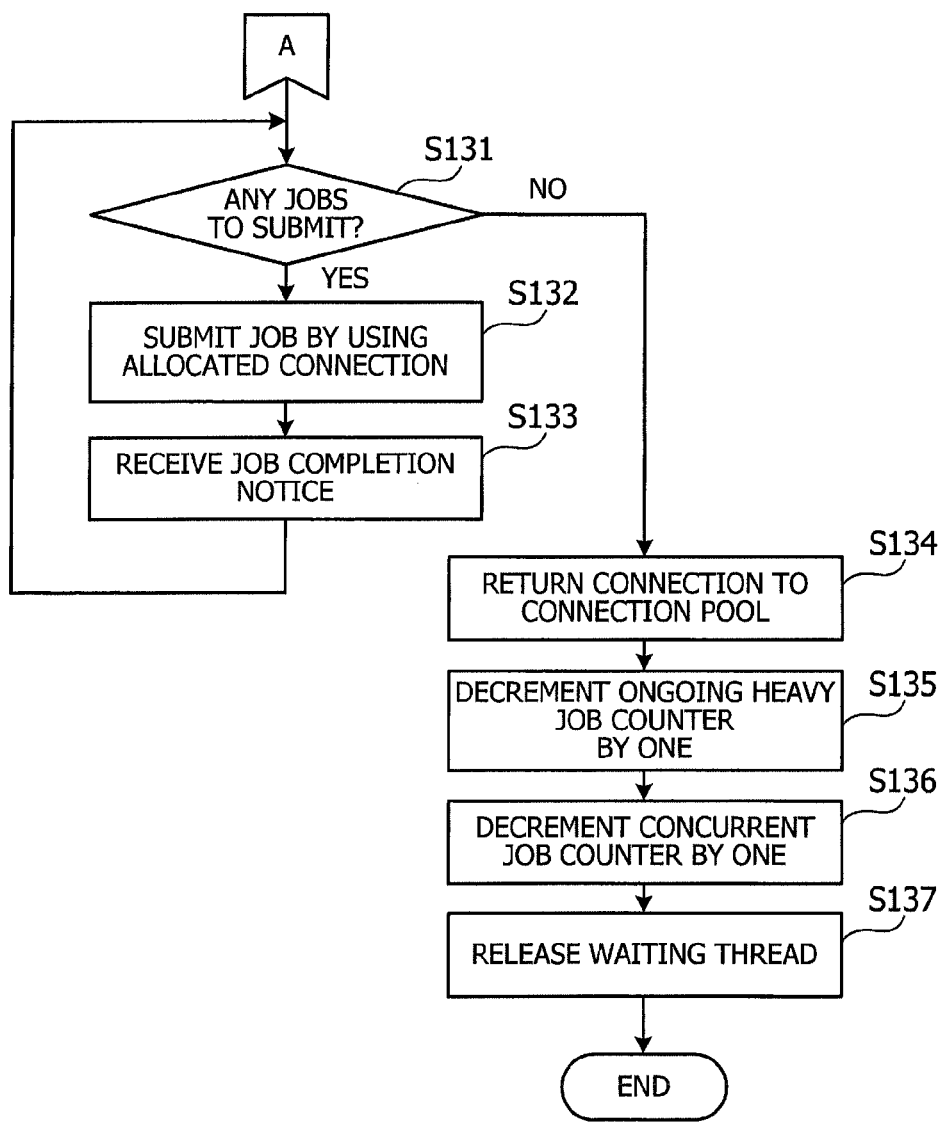

FIG. 17 is the second half of the flowchart illustrating an exemplary procedure of heavy job count control. Each step of FIG. 17 is described below in the order of step numbers.

(Step S131) Since a connection is received from the heavy job control unit 150, the thread 141*a* determines whether it has any (more) job to submit. If it has, the thread 141*a* advances to step S132. If not, the thread 141*a* branches to S134.

(Step S132) The thread 141*a* submits a job to the database server 300 by using the allocated connection.

(Step S133) The thread 141*a* receives a completion notice from the database server 300 as a response to the job submitted at step S132. The thread 141*a* then goes back to step S131.

(Step S134) The thread 141*a* returns its connection to the connection pool 151. For example, the thread 141*a* sends a connection return notice to the heavy job control unit 150. In response to this notice, the heavy job control unit 150 deallocates the connection from the thread 141*a*.

(Step S135) The heavy job control unit 150 decrements by one the ongoing heavy job counter 115 in the parameter storage unit 110.

(Step S136) The heavy job control unit 150 decrements by one the concurrent job counter 114 in the parameter storage unit 110.

(Step S137) The heavy job control unit 150 releases the waiting state of a thread. For example, there may be some threads having heavy jobs to submit. Then the heavy job control unit 150 selects one of those threads that has the oldest connection allocation request and releases its waiting state. The heavy job control unit 150 also informs the light job control unit 160 that a connection has been returned. When there are some threads having light jobs to submit, the light job control unit 160 selects one of those threads that has the oldest connection allocation request and releases its waiting state. A connection is thus allocated to the earliest thread in preference to later threads, since the releasing of waiting threads is applied in the order of arrival of connection allocation requests.

Figure 18:
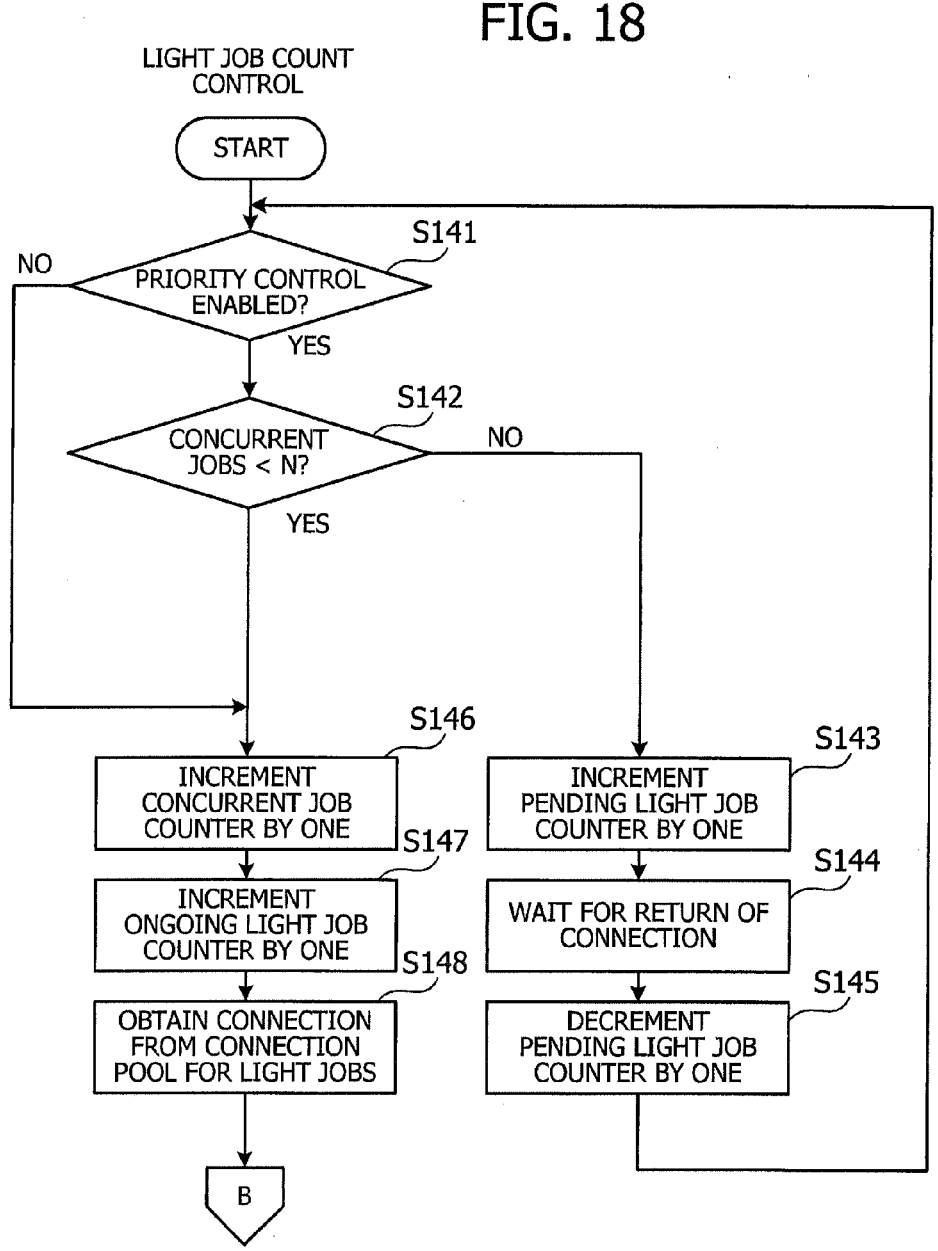
FIGS. 18 and 19 are first and second halves of a flowchart illustrating an exemplary procedure of light job count control.

The next flowchart explains how the light job control unit 160 controls job counts. FIG. 18 is the first half of a flowchart illustrating an exemplary procedure of light job count control. Each step of FIG. 18 is described below in the order of step numbers. This light job count control procedure is invoked when a connection allocation request from a thread in applications 143 and 144 arrives at the light job control unit 160. The following explanation assumes that one thread 143*a* has issued a connection allocation request.

(Step S141) The light job control unit 160 determines whether the job priority control is enabled. For example, the light job control unit 160 tests the priority control flag 111 in the parameter storage unit 110. If it is set to one, the light job control unit 160 determines that job priority control is enabled, and thus advances to step S142. If job priority control is disabled, the light job control unit 160 skips to step S146.

(Step S142) Since job priority control is enabled, the light job control unit 160 then determines whether the number of concurrent jobs (i.e., the total number of jobs being executed on the database server 300) is smaller than the maximum concurrent job count N in the parameter storage unit 110.

Here the number of concurrent jobs is obtained by reading the concurrent job counter 114 in the parameter storage unit 110. If that number is smaller than N, the light job control unit 160 advances to step S146. Otherwise, the light job control unit 160 branches to step S143.

(Step S143) The light job control unit 160 increments by one the pending light job counter 118 in the parameter storage unit 110.

(Step S144) The light job control unit 160 makes the thread 143*a* wait until a connection is returned to either of the connection pools 151 and 161.

(Step S145) When a connection is returned, the thread 143*a* is allowed to exit from the waiting state. The light job control unit 160 then decrements by one the pending light job counter 118 in the parameter storage unit 110 and then goes back to S141.

(Step S146) The light job control unit 160 increments by one the concurrent job counter 114 in the parameter storage unit 110.

(Step S147) The light job control unit 160 increments by one the ongoing light job counter 116 in the parameter storage unit 110.

(Step S148) The light job control unit 160 takes out one connection from its connection pool 161 and allocates the connection to the requesting thread 143*a*. The light job control unit 160 now moves to step S151 (FIG. 19).

Figure 19:
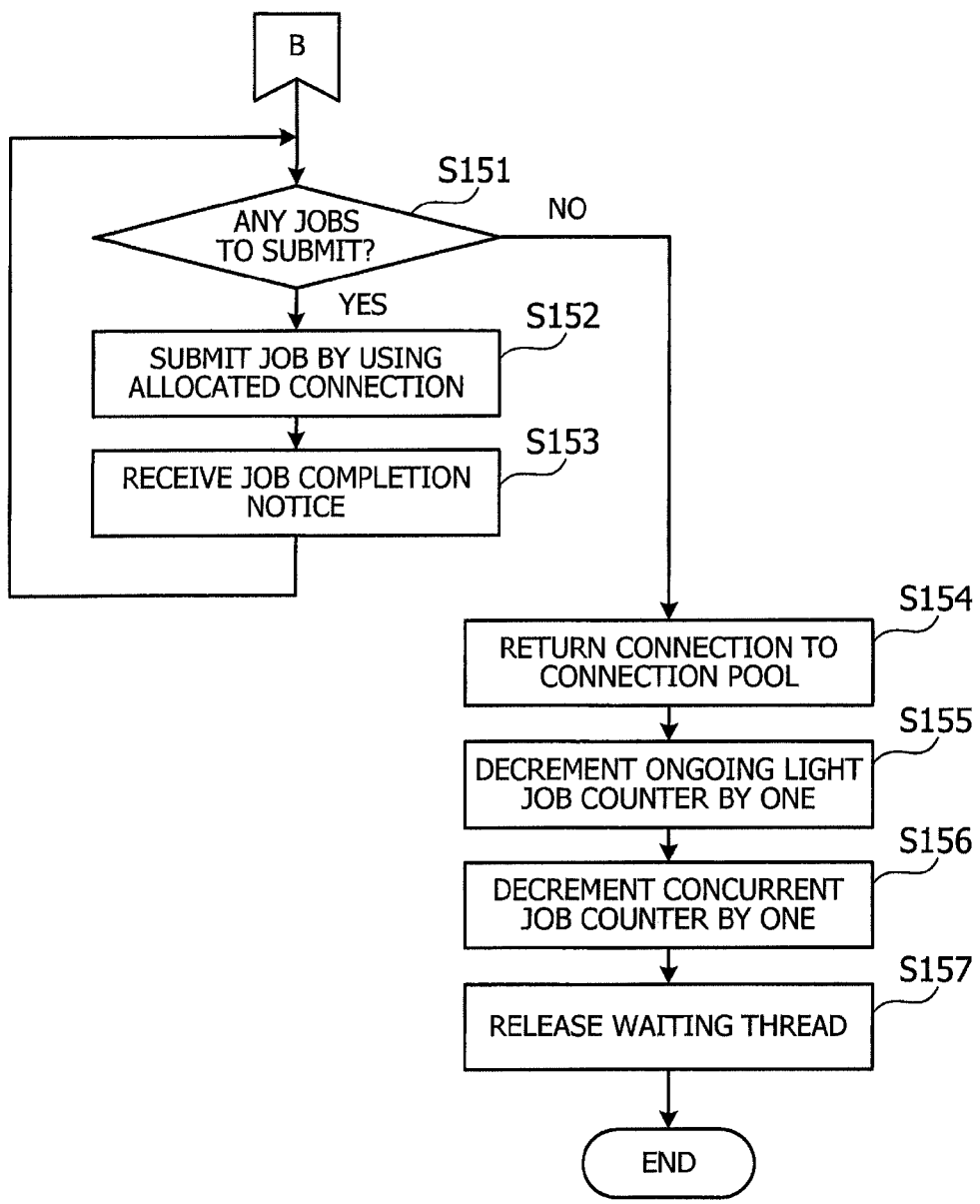

FIG. 19 is the second half of the flowchart illustrating an exemplary procedure of light job count control. Each step of FIG. 19 is described below in the order of step numbers.

(Step S151) Since a connection is received from the light job control unit 160, the thread 143*a* determines whether it has any (more) job to submit. If it has, the thread 143*a* advances to step S152. If not, the thread 143*a* branches to S154.

(Step S152) The thread 143*a* submits a job to the database server 300 by using the allocated connection.

(Step S153) The thread 143*a* receives a completion notice from the database server 300 as a response to the job submitted at step S152. The thread 143*a* then goes back to step S151.

(Step S154) The thread 143*a* returns its connection to the connection pool 161. For example, the thread 143*a* sends a connection return notice to the light job control unit 160. In response to this notice, the light job control unit 160 deallocates the connection from the thread 143*a*.

(Step S155) The light job control unit 160 decrements by one the ongoing light job counter 116 in the parameter storage unit 110.

(Step S156) The light job control unit 160 decrements by one the concurrent job counter 114 in the parameter storage unit 110.

(Step S157) The light job control unit 160 releases the waiting state of a thread. For example, when there are some threads having light jobs to submit, the light job control unit 160 selects one of those threads that has the oldest connection allocation request and releases its waiting state. The light job control unit 160 also informs the heavy job control unit 150 that a connection has been returned. There may be some threads having heavy jobs to submit. Then the heavy job control unit 150 selects one of those threads that has the oldest connection allocation request and releases its waiting state.

As can be seen from the above flowchart, the second embodiment performs dynamic priority control based on the number of jobs submitted to the database server 300. In other words, one tier observes resources becoming saturated in another tier, based not on the lengths of queues, but on variations of the number of concurrent jobs. It is therefore possible for the application server 100 to find an appropriate point for raising the priority of light jobs just before the database server 300 falls into a fully saturated state. This feature helps light jobs escape from influence of heavy jobs before the response time of light jobs becomes long.

The average response time of jobs is reduced by raising the execution priority of light jobs. It is thus possible to prevent upper-tier servers from being affected by exhaustion of resources in lower-tier servers. As a result, the system can serve the user terminals without wild fluctuations of response time.

Figure 20:
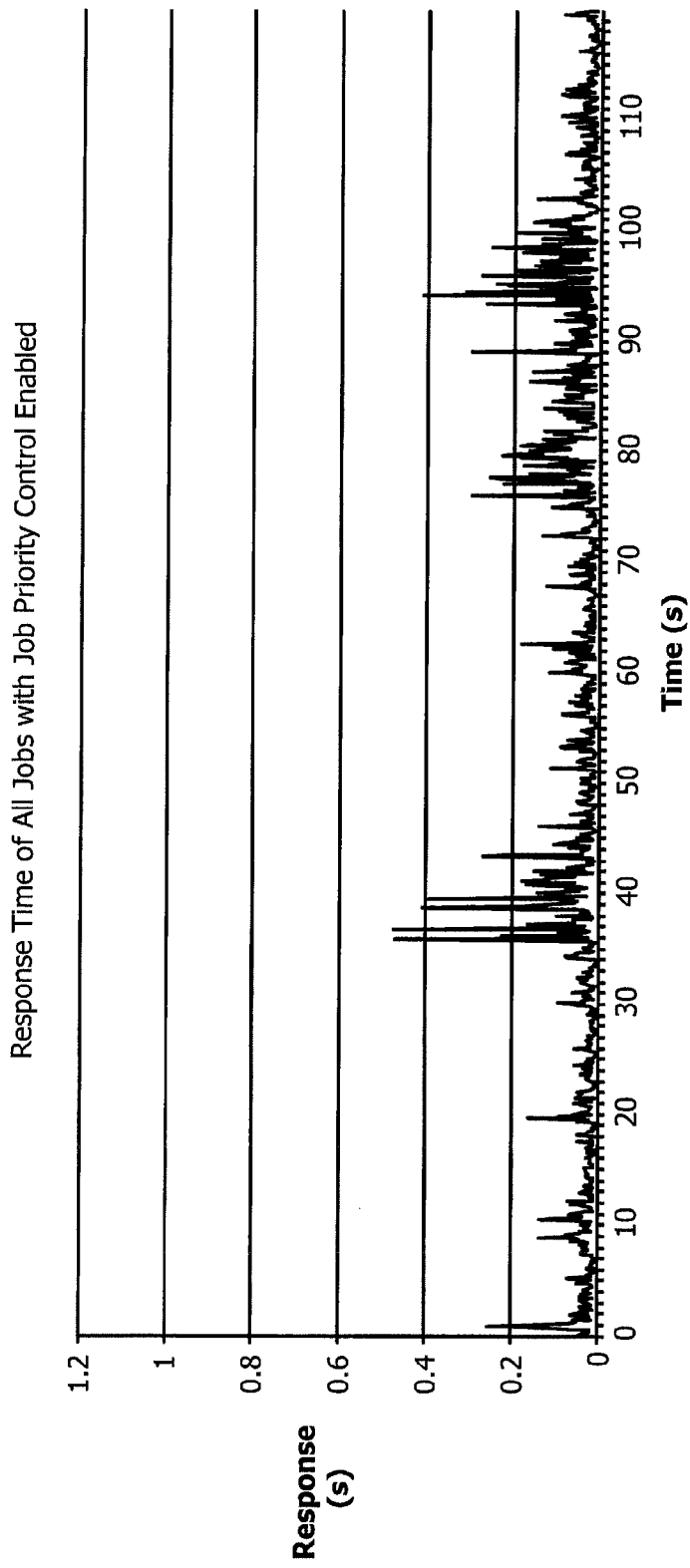
FIG. 20 is an exemplary graph illustrating temporal changes of average response time when job priority control is enabled.

FIG. 20 is an exemplary graph illustrating temporal changes of average response time when job priority control is enabled. This graph of FIG. 20 plots response time in the vertical axis, against the passage of time in the horizontal axis. Here each plotted value of response time is an average in a fine time granularity (e.g., time step size of 0.1 second). This graph in FIG. 20 demonstrates effective suppression of peak response time of the system, in contrast to the graph in FIG. 3 previously discussed for the case without job priority control. In other words, the fluctuation of response time is alleviated.

According to the second embodiment, the raised priority of light jobs over heavy jobs is maintained as long as the number of concurrently executed light jobs exceeds threshold $\alpha$. The resulting temporary concentration of light job submission to the database server 300 would raise the number of ongoing light jobs above the threshold $\alpha$, during which heavy jobs are kept in a waiting state. The system, however, will soon leave this state because light jobs do not take much time to complete. For this reason, keeping the heavy jobs waiting does little harm to the system's response time.

According to the second embodiment, the above-described job count control functions of the application server 100 are also implemented in the servers in every relevant tier that submits jobs to lower tiers. Job priority control in such servers is disabled usually. When a server is observed to be partially saturated in its tier, the analysis server 400 sends a priority control enable command to an upper-tier server associated with the partially-saturated server, so that the receiving upper-tier server activates its job priority control. The proposed job priority control also works properly in other servers than the database server 300.

When it is detected that a server has become fully saturated in a certain tier, the analysis server 400 sends a priority control disable command to an upper-tier server associated with that saturated server, so that the receiving upper-tier server disable the job priority control. That is, the job priority control is disabled upon detection of full saturation of performance. This is for the following reasons.

Once a lower tier is completely saturated, the job priority control in its upper can do little against wild fluctuations of response time. Also, if the upper tier continues submitting light jobs in preference to others, heavy jobs would have no opportunity for execution. The resulting execution order of jobs is unfair and unacceptable. In view of this, the second embodiment is configured to stop job priority control when the performance is fully saturated (and the job priority control is thus ineffective), so that the jobs will be executed equally and fairly in the order of their arrival.

Applications may occasionally produce a burst of heavy jobs. Although such a burst does not last long, it could drive the database server 300 into partial saturation even if the number of concurrent light jobs is smaller than threshold $\alpha$. In this case, the priority of light jobs is not raised because of the number of ongoing light jobs does not increase. The database server 300, on the other hand, will reach full saturation as a result of submission of many heavy jobs. Accordingly, there is no point in giving priority to light jobs when a burst of heavy jobs is visiting.

(c) Third Embodiment

This section describes a third embodiment. As will be described in detail below, the third embodiment permits the individual servers in a multi-tier system to determine, at their own discretion, whether to enable their job priority control.

Figure 21:
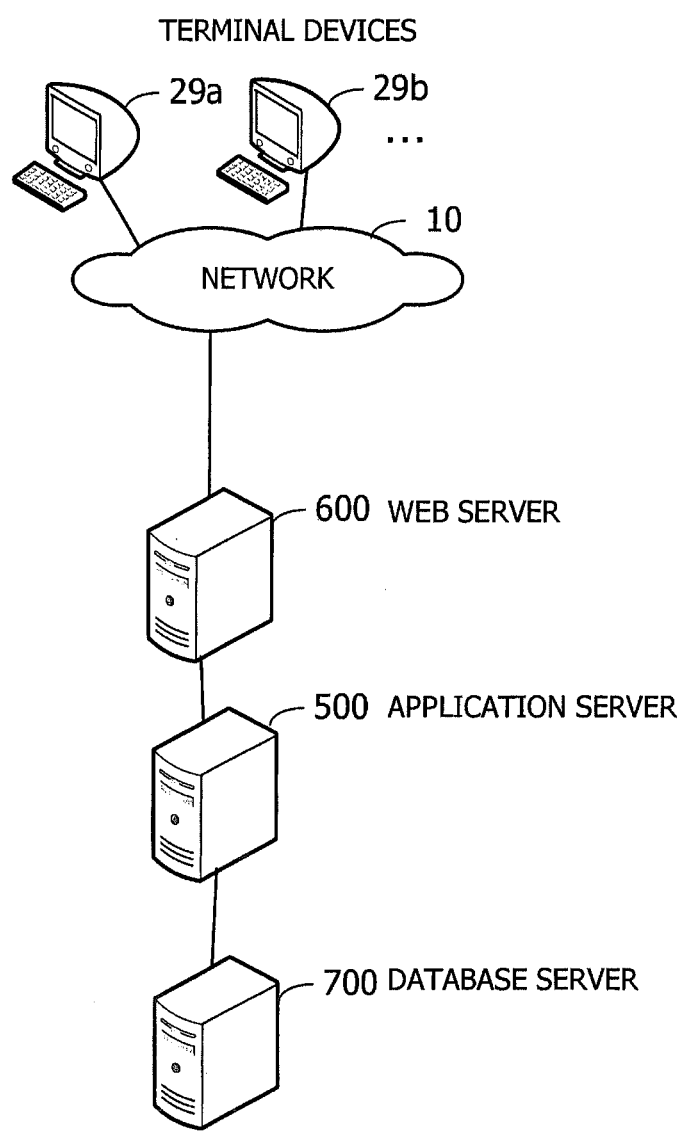
FIG. 21 illustrates an exemplary overall structure of a system according to a third embodiment.

FIG. 21 illustrates an exemplary overall structure of a system according to the third embodiment. The illustrated web three-tier system is formed from a web server 600, an application server 500, and a database server 700. A plurality of terminal devices 29a, 29b, are attached to the web server 600 via a network 10. The web three-tier system provides services to users sitting at those terminal devices.

As can be seen from FIG. 21, the web three-tier system of the third embodiment has no servers directly equivalent to the analysis server 400 in the second embodiment, which is deployed to detect partial saturation of a server and regulate job submission to that server by enabling job priority control in its upper-tier server. The third embodiment needs no dedicated analysis servers because the server of each tier is designed to switch its job priority control autonomously. This elimination of analysis servers simplifies integration of the system.

The foregoing second embodiment uses external commands for enabling or disabling job priority control. One simple solution for eliminating such external commands is to activate the job priority control permanently. This method would, however, allow a low-tier server in a fully saturated state to only execute light jobs without taking care of long-delayed heavy jobs. The third embodiment is thus designed to disable the job priority control in two job control units 150 and 160 when the waiting time of heavy jobs in the heavy job control unit 150 reaches a certain limit. The job priority control is otherwise enabled by default. This method permits the heavy job control unit 150 to restart execution of heavy jobs when a low-tier server reaches a fully-saturated state.

The third embodiment differs from the second embodiment in at least two points described below. The first difference is that each tier operates autonomously without the help of an external detector of partial saturation, and job priority control is enabled by default even if the tier in question is not saturated al all. The second difference is that fully-saturated state of a low-tier server is determined from the waiting time of jobs in the heavy job control unit 150.

Because of the above two differences, and particularly of the first difference, the job priority control is responsive to even a short burst of light jobs in low-workload conditions. This could results in degradation of overall system performance, i.e., both throughput (processing capacity per unit time) and response time of the system. It is noted, however, that servers usually execute both light jobs and heavy jobs until the number of concurrent light jobs exceeds threshold α. For this reason, servers in low-workload conditions would rarely exert suspension of heavy jobs, which means that the expected performance degradation of the system is negligibly small. In other words, there is no significant problem in activating job priority control by default, even when the servers are not saturated at all.

In the foregoing second embodiment, the application server 100 receives maximum concurrent job count N from the analysis server 400. Unlike the second embodiment, the third embodiment assumes that the administrator previously enters maximum concurrent job count N to each server. The following description of the third embodiment focuses on how its heavy job control unit 550 is different from its counterpart in the second embodiment.

Figure 22:
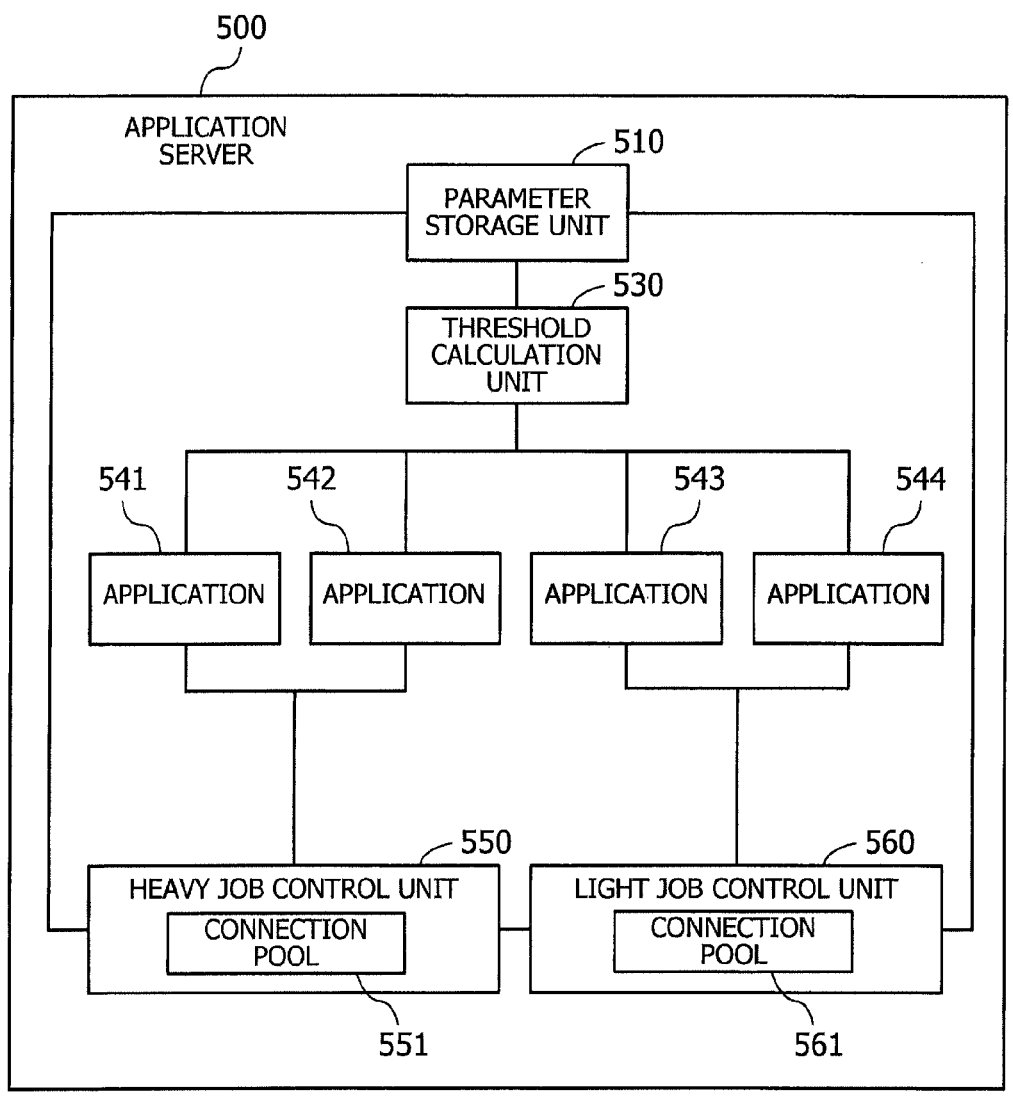
FIG. 22 illustrates an example of functions provided in an application server according to the third embodiment.

FIG. 22 illustrates an example of functions provided in an application server according to the third embodiment. The illustrated application server 500 includes, among others, a parameter storage unit 510, a threshold calculation unit 530, and a plurality of applications 541 to 544. Also included are two job control units 550 and 560 for heavy jobs and light jobs, respectively. The heavy job control unit 550 has a connection pool 551 from which connections are allocated to threads that execute heavy jobs. Similarly the light job control unit 560 has its own connection pool 561 from which connections are allocated to threads that execute light jobs. All the illustrated elements in FIG. 22, except for the parameter storage unit 510 and heavy job control unit 550, provide the same functions as their counterparts in the second embodiment discussed in FIG. 9.

Figure 23:
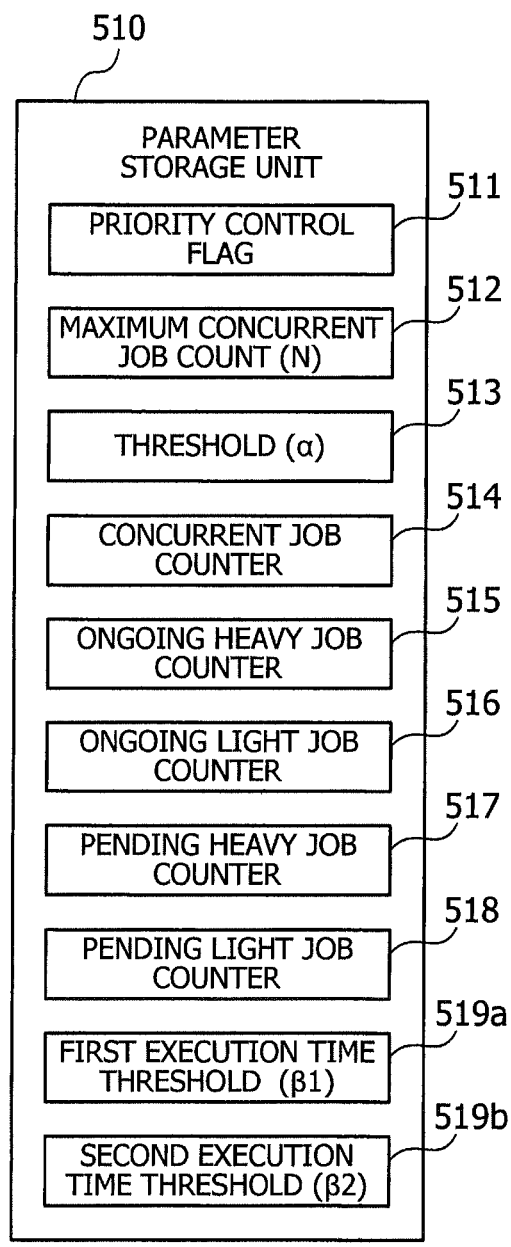
FIG. 23 illustrates an exemplary data structure of a parameter storage unit according to the third embodiment.

According to the third embodiment, the parameter storage unit 510 stores two more parameters than the parameter storage unit 110 in the second embodiment to provide two threshold values related to the waiting time of heavy jobs. FIG. 23 illustrates an exemplary data structure of this parameter storage unit 510. Specifically, the parameter storage unit 510 contains the following parameters: priority control flag 511, maximum concurrent job count 512, threshold 513, concurrent job counter 514, ongoing heavy job counter 515, ongoing light job counter 516, pending heavy job counter 517, pending light job counter 518, first execution time threshold 519a, and second execution time threshold 519b. The parameters other than the last two are equivalent to those discussed in FIG. 10 for the second embodiment.

First execution time threshold 519a is used to evaluate waiting time of heavy jobs in determining whether to activate job priority control. Specifically, job priority control is activated when the waiting time of heavy jobs falls below this first execution time threshold 519a with a value of β1. Second execution time threshold 519b is also used to evaluate waiting time of heavy jobs, but in determining whether to deactivate job priority control. Specifically, job priority control is deactivated when the waiting time of heavy jobs exceeds this second execution time threshold 519b with a value of $β_2$.

The heavy job control unit 550 functions similarly to the foregoing heavy job control unit 150 in FIG. 9 according to the second embodiment. In addition, the heavy job control unit 550 has the function of switching (activating and deactivating) job priority control.

In operation of the third embodiment, the system administrator allows the servers to use their job priority control functions when the tiers are in low workload conditions. For example, the system administrator sets a default state of servers in such a way that the job priority control will be activated upon startup of each server. The servers switch the on-off mode of their priority control individually, depending on the workload condition of their respective lower-tier servers.

More specifically, the job priority control is disabled when the waiting time of jobs in the heavy job control unit 550 exceeds a previously given second execution time threshold $β_2$, so that the low-tier server starts execution of heavy jobs. The job priority control is enabled again when the waiting time of jobs in the heavy job control unit 550 falls below a previously given first execution time threshold $β_1$, where $β_1 ≤ β_2$. As will be described later, the job priority control may also be switched on the basis of job execution time including waiting time of connection resources, rather than the waiting time per se.

According to the third embodiment, the timing for switching of job priority control is when the execution of a heavy job is finished. Details of this switching procedure will now be described below. As the third embodiment uses the first half of heavy job count control illustrated in FIG. 16, the following section only describes the second half of the procedure with reference to FIG. 24.

Figure 24:
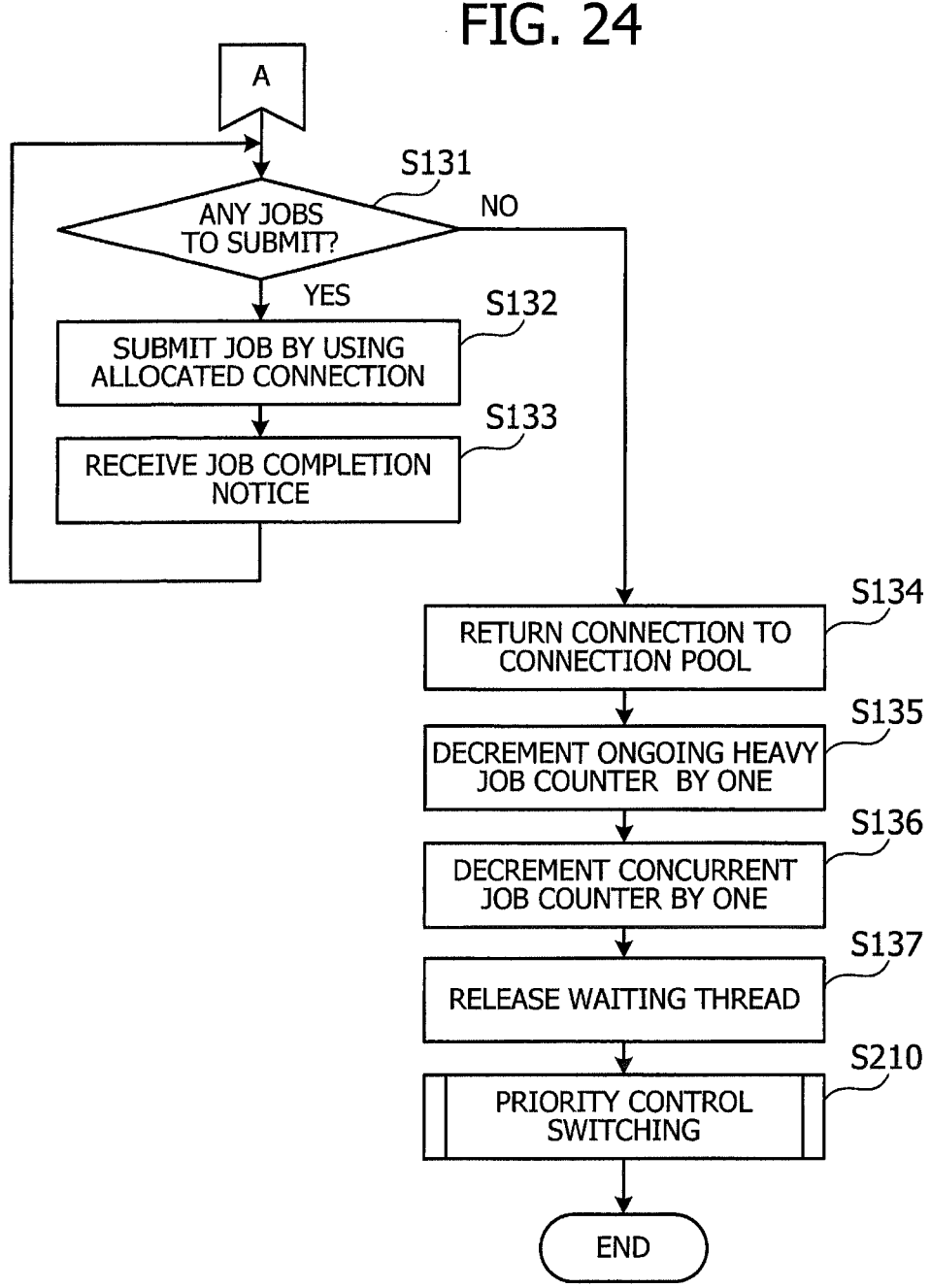
FIG. 24 is the second half of a flowchart illustrating an exemplary procedure of heavy job number control according to the third embodiment.

FIG. 24 is the second half of a flowchart illustrating an exemplary procedure of heavy job number control according to the third embodiment. The second and third embodiments share several steps in this procedure, which are thus labeled with the same step numbers used in FIGS. 17 and 24. See the previous description for those shared steps. Referring to FIG. 24, step S210 is the only step that is different from the second embodiment. This step S210 operates as follows.

(Step S210) After releasing the waiting state of a thread at step S134, the heavy job control unit 550 calls a priority control switching procedure. Upon completion, the heavy job control unit 550 terminates the heavy job count control of FIG. 24.

Figure 25:
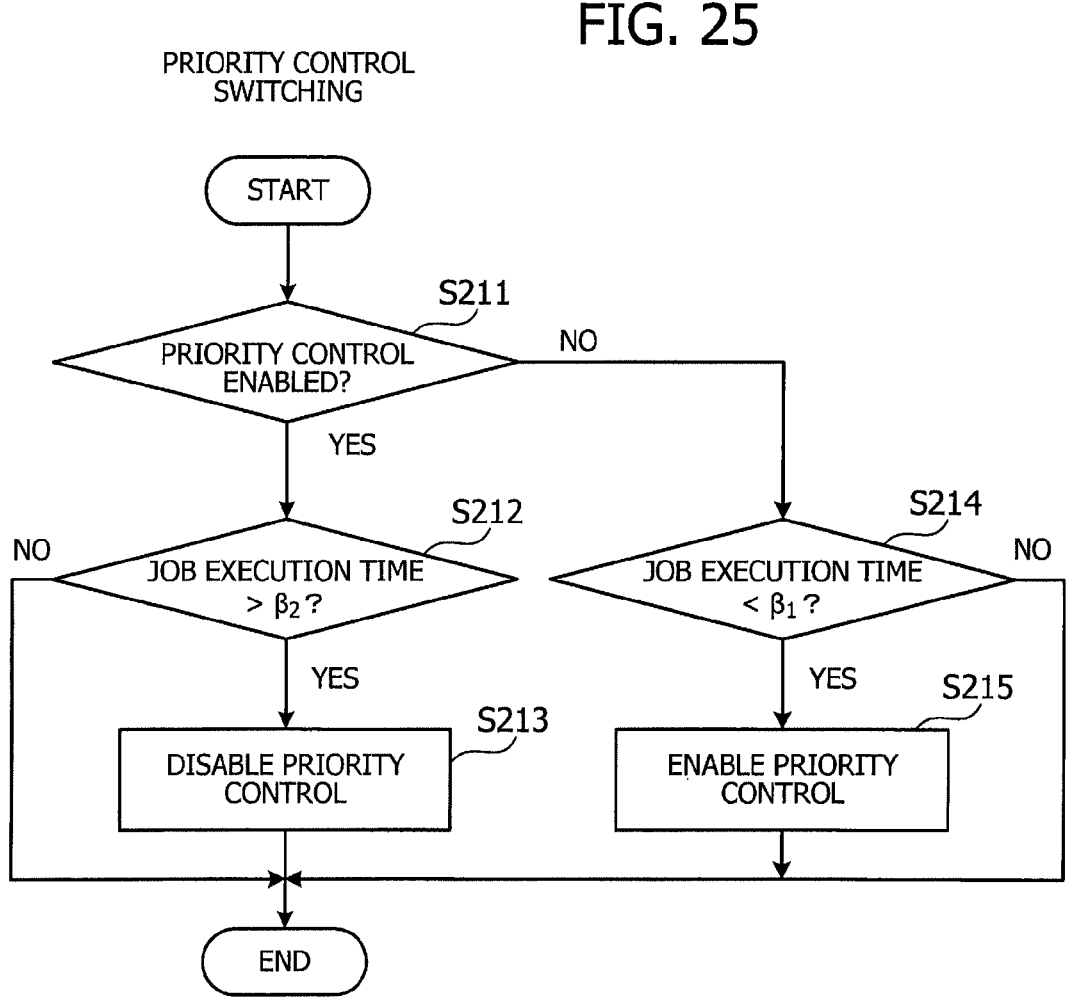
FIG. 25 is a flowchart illustrating an exemplary procedure of priority control switching.

FIG. 25 is a flowchart illustrating an exemplary procedure of priority control switching. Each step of FIG. 25 is described below in the order of step numbers.

(Step S211) The heavy job control unit 550 determines whether the job priority control is enabled. For example, the heavy job control unit 550 tests the priority control flag 511 in the parameter storage unit 510. If it is set to one, the heavy job control unit 550 determines that the job priority control is enabled, and thus advances to step S212. If job priority control is disabled, the heavy job control unit 550 proceeds to step S214.

(Step S212) The heavy job control unit 550 determines whether the execution time of a heavy job exceeds the second execution time threshold $\beta_2$. The execution time includes waiting time that the job spent to obtain a connection. If the execution time exceeds $\beta_2$, the heavy job control unit 550 advances to step S213. Otherwise, the heavy job control unit 550 terminates the priority control switching procedure.

(Step S213) The heavy job control unit 550 disables the job priority control. For example, the heavy job control unit 550 clears the priority control flag 511 to zero in the parameter storage unit 510, and terminates the priority control switching procedure.

(Step S214) Since the job priority control is disabled, the heavy job control unit 550 determines whether the execution time of a heavy job, including waiting time spent to obtain a connection, is below the first execution time threshold $\beta_1$. If the execution time is below $\beta_1$, then the heavy job control unit 550 advances to step S215. Otherwise, the heavy job control unit 550 terminates the priority control switching procedure.

(Step S215) The heavy job control unit 550 enables the job priority control again. For example, the heavy job control unit 550 sets the priority control flag 511 to one in the parameter storage unit 510, and terminates the priority control switching procedure.

Each server executes the above processing, thereby switching the job priority control autonomously. The third embodiment is, however, not limited to the switching method described above. For example, the job priority control may be disabled by the heavy job control unit 550 when the waiting time of heavy job is determined to exceed a predetermined threshold $\gamma$ as many times in a row as specified, or keeps exceeding $\gamma$ for a specified length of time. Also, the job priority control may be activated again by the heavy job control unit 550 when the waiting time of heavy jobs is determined to fall short of the threshold $\gamma$ as many times in a row as specified, or keeps below $\gamma$ for a specified length of time.

As can be seen from the above, the third embodiment uses waiting time of heavy jobs or execution time including the same to determine the workload condition of a low-tier server.

(d) Fourth Embodiment

This section describes a fourth embodiment which expands the number of job control units to three or more. While the foregoing second embodiment has two job control units per server, it is possible to implement n job control units in a server, where n is an integer greater than two. In place of threshold $\alpha$ in the second embodiment, the fourth embodiment uses n−1 thresholds $\alpha_1, \alpha_2, \ldots, \alpha_{n-1}$, where $0<\alpha_1<\alpha_2<\ldots<\alpha_{n-1}<N$, to provide jobs with n priority levels. This increased number of threshold values enables more fine-grained control of job priorities even in the case where different job categories have too different execution times to sort them into two groups. The following detailed description is directed to an application server according to the fourth embodiment, assuming the same system configuration of FIG. 7 discussed in the second embodiment.

Figure 26:
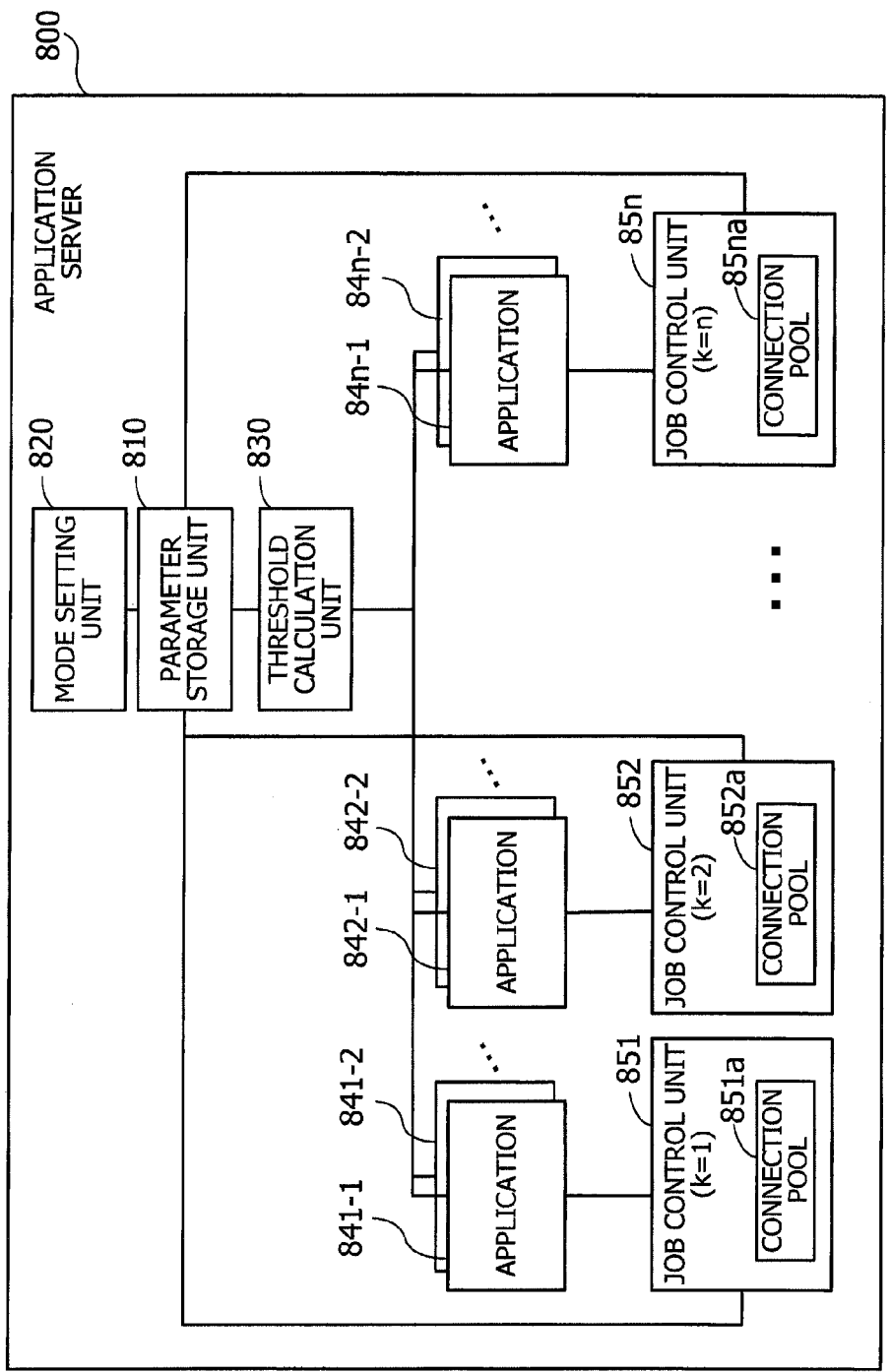
FIG. 26 illustrates an example of functions provided in an application server according to a fourth embodiment.

FIG. 26 illustrates an example of functions provided in an application server according to the fourth embodiment. The illustrated application server 800 includes a parameter storage unit 810, a mode setting unit 820, a threshold calculation unit 830, a plurality (2n) of applications 841-1, 841-2, . . . , 842-1, 842-2, . . . , 84n-1, 84n-2, . . . , and a plurality (n) of job control units 851, 852, . . . , 85n. The job control units 851, 852, . . . , 85n manage their respective connection pools 851a, 852a, . . . , 85na.

The job control units 851, 852, . . . , 85n are assigned identifiers k, where k is an integer in the range from 1 to n. These job control units 851, 852, . . . , 85n are each designated as the destination of connection allocation requests from a particular application group constituted by one or more applications. Here the identifiers of job control units are arranged in the order of lightness of jobs that their associated application groups produce. Specifically, an application group producing lighter jobs is associated with a job control unit with a smaller identifier. Referring to FIG. 26, the leftmost job control unit 851 has an identifier k=1, meaning that the job control unit 851 receives connection allocation requests from an application group that produces the lightest category of jobs. The rightmost job control unit 85n, on the other hand, has an ID number k=n, meaning that job control unit 85n receives connection allocation requests from an application group that produces the heaviest category of jobs The job control unit with an identifier k=i may be referred to herein as the "i-th job control unit." Further, a collection of jobs submitted from applications associated with the i-th job control unit to the database server 300 are referred to herein as the "i-th category of jobs."

Referring to FIG. 26, applications 841-1, 841-2, . . . in the leftmost group send connection allocation requests to their designated job control unit 851. Threads of these applications 841-1, 841-2, . . . receive an allocation of connections from the first job control unit 851 and submit jobs to the database server 300 by using the allocated connections.

Applications 842-1, 842-2, . . . in the next group send connection allocation requests to their designated job control unit 852. Threads of these applications 842-1, 842-2, . . . receive an allocation of connections from the second job control unit 852 and submit jobs to the database server 300 by using the allocated connections.

Applications 84*n*-1, 84*n*-2, . . . in the rightmost group send connection allocation requests to their designated job control unit 85*n*. Threads of these applications 84*n*-1, 84*n*-2, . . . receive an allocation of connections from the n-th job control unit 85*n* and submit jobs to the database server 300 by using the allocated connections.

Figure 27:
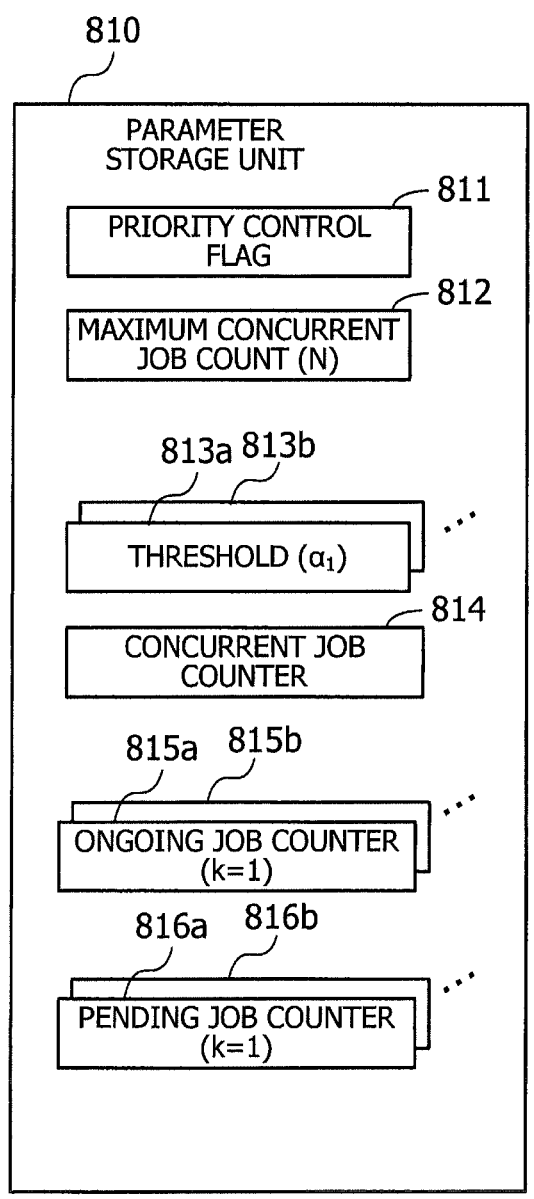
FIG. 27 illustrates an exemplary data structure of a parameter storage unit according to the fourth embodiment.

According to the fourth embodiment, the parameter storage unit 810 stores data objects described below. FIG. 27 illustrates an exemplary data structure of the parameter storage unit 810. The illustrated parameter storage unit 810 contains the following data objects: priority control flag 811, maximum concurrent job count 812, a plurality of thresholds 813*a*, 813*b*, . . . , concurrent job counter 814, a plurality of ongoing job counters 815*a*, 815*b*, . . . , and a plurality of pending job counters 816*a*, 816*b*, . . . . The priority control flag 811, maximum concurrent job count 812, and concurrent job counter 814 are similar to their counterparts in FIG. 10 according to the second embodiment.

The thresholds 813*a*, 813*b*, . . . serve as the plurality (n−1) of threshold values $\alpha_1, \alpha_2, \ldots, \alpha_{n-1}$ mentioned above. Ongoing job counters 815*a*, 815*b*, . . . are associated directly with the job control units 851, 852, . . . and 85*n*, respectively. Each ongoing job counter 815*a*, 815*b*, . . . indicates the number of jobs that have been submitted from the associated job control unit and are currently executed on the database server 300.

The pending job counters 816*a*, 816*b*, . . . are associated directly with the job control units 851, 852, . . . and 85*n*, respectively. Each pending job counter 816*a*, 816*b*, . . . indicates the number of jobs that are awaiting execution in a queue of the associated job control unit.

Figure 28:
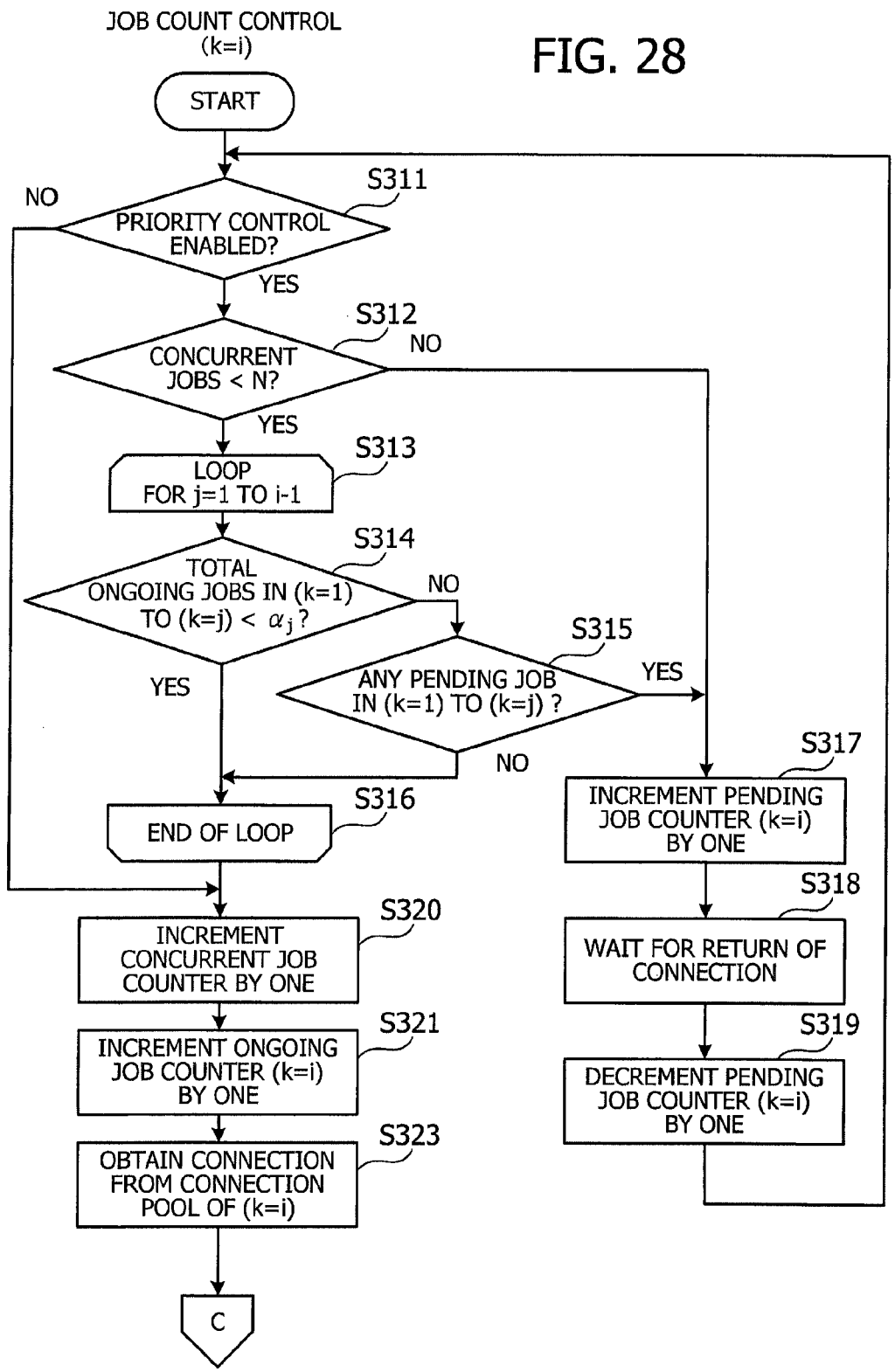
FIGS. 28 and 29 are first and second halves of a flowchart illustrating an exemplary procedure of job count control according to the fourth embodiment.

Detailed operation of the i-th job control unit (k=i) of the fourth embodiment will now be described below. FIG. 28 is the first half of a flowchart illustrating an exemplary procedure of job count control according to the fourth embodiment. This procedure is executed by the i-th job control unit when a connection allocation request is received from a thread of its associated applications. Each step of FIG. 28 is described below in the order of step numbers.

(Step S311) The i-th job control unit determines whether the job priority control is enabled. If job priority control is enabled, the i-th job control unit proceeds to step S312. If job priority control is disabled, the i-th job control unit skips to step S320.

(Step S312) Since job priority control is enabled, the i-th job control unit determines whether the number of concurrent jobs (i.e., the total number of jobs being executed on the database server 300) is smaller than the maximum concurrent job count N in the parameter storage unit 810. Here the number of concurrent jobs is obtained by reading the concurrent job counter 814 in the parameter storage unit 810. If that number is smaller than N, the i-th job control unit advances to step S313. If that number is greater than or equal to N, the i-th job control unit branches to step S317.

(Step S313) The i-th job control unit repetitively executes the following steps S314 and S315 while incrementing variable j by one, from j=1 to j=i−1, each time a repetition is made.

(Step S314) The i-th job control unit determines whether the total number of ongoing jobs for k=1 to k=j is smaller than the j-th threshold $\alpha_j$. For example, the i-th job control unit adds up the current values of ongoing job counters for k=1, 2, . . . , j in the parameter storage unit 810. If the resulting sum is smaller than the j-th threshold $\alpha_j$, then the i-th job control unit advances to step S316. If the resulting sum is greater than or equal to the j-th threshold $\alpha_j$, then the i-th job control unit advances to step S315.

(Step S315) The i-th job control unit determines whether there is any pending job in the first job control unit (k=1) to j-th job control unit (k=j). For example, if a value of one or more is found in any one of the first to j-th ongoing job counters in the parameter storage unit 810, it means the presence of a pending job(s). When this is the case, the i-th job control unit exits from the loop of steps S313 to S316 and proceeds to step S317. Otherwise, the i-th job control unit proceeds to step S316.

(Step S316) When steps S314 and S315 have been executed for each of j=1 to j=i−1 without encountering YES at step S315, the i-th job control unit exits from the loop and proceeds to step S320.

(Step S317) This step S317 is reached either when the number of concurrent jobs is greater than or equal to maximum concurrent job count N, or when the test at step S315 returns YES. The i-th job control unit increments by one the i-th pending job counter (k=i) in the parameter storage unit 810.

(Step S318) The i-th job control unit causes the requesting thread in the application 84*i*-1 to wait until a connection is returned to any connection pools.

(Step S319) When a connection is returned, the requesting thread is allowed to exit from the waiting state. The i-th job control unit then decrements by one the i-th pending job counter (k=i) in the parameter storage unit 810 and goes back to step S311.

(Step S320) This step S320 is reached either when the job priority control is disabled, or when the i-th job control unit has finished the loop without ever encountering YES at step S315. The i-th job control unit then increments by one the concurrent job counter 814 in the parameter storage unit 810.

(Step S321) The i-th job control unit increments by one the i-th ongoing job counter (k=i) in the parameter storage unit 810

(Step S322) The i-th job control unit takes out one connection from its own connection pool and allocates it to the requesting thread. The i-th job control unit then proceeds to step S331 (FIG. 29).

Figure 29:
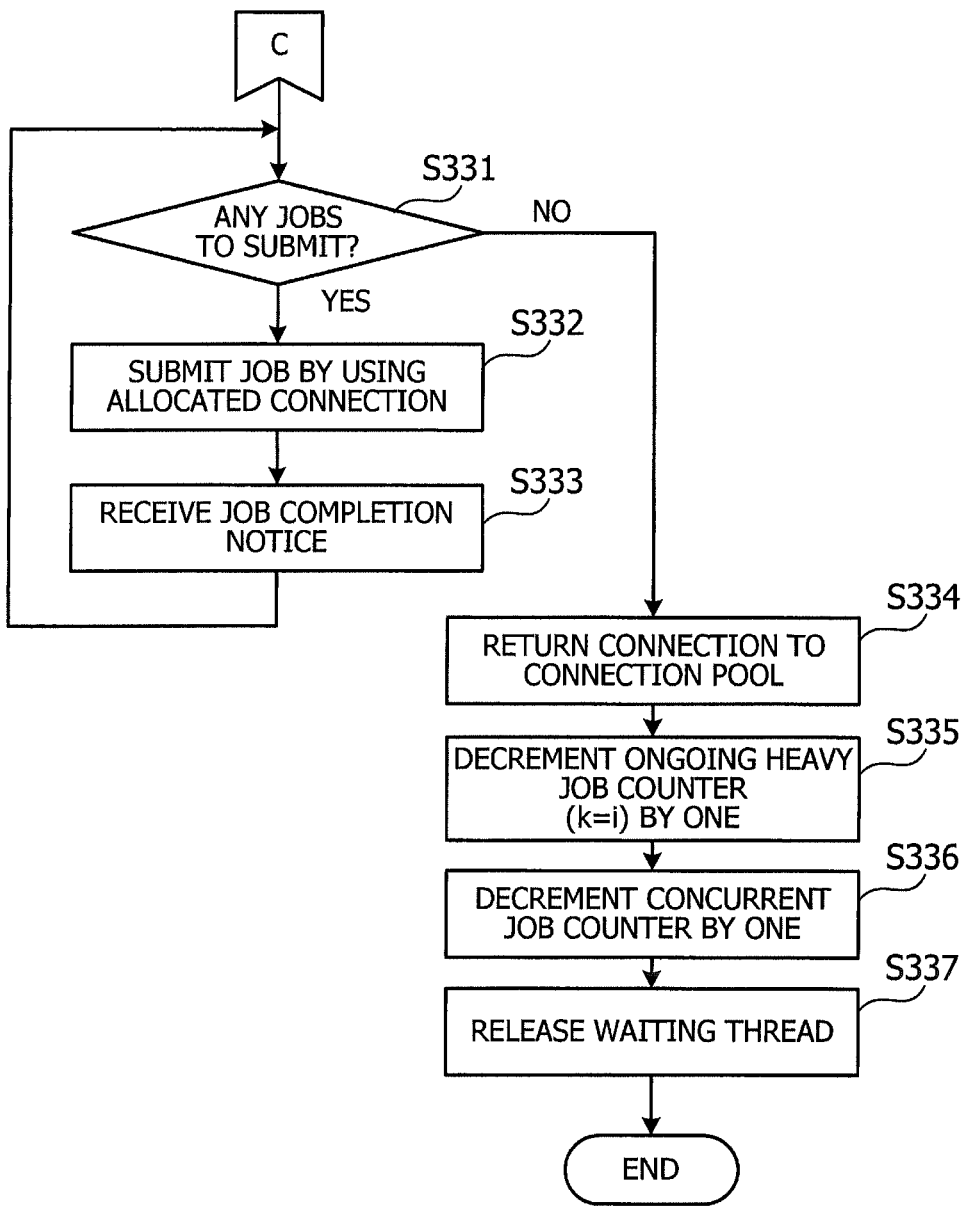

FIG. 29 is the second half of the flowchart illustrating an exemplary procedure of job count control according to the fourth embodiment. Each step of FIG. 29 is described below in the order of step numbers.

(Step S331) Since a connection is received from the i-th job control unit, the requesting thread then determines whether it has any (more) job to submit. If it has, the thread advances to step S332. If has no jobs to submit, the thread branches to S334.

(Step S332) The thread submits its i-th category of job to the database server 300 by using the allocated connections.

(Step S333) The thread receives a completion notice from the database server 300 as a response to the job submitted at step S332. The thread then goes back to step S331.

(Step S334) The thread returns its allocated connection to the original connection pool. For example, the thread sends a connection return notice to the i-th job control unit. In response to this notice, the i-th job control unit deallocates the connection from the thread.

(Step S335) The i-th job control unit decrements by one the i-th ongoing job counter (k=i) in the parameter storage unit 810.

(Step S336) The i-th job control unit decrements by one the concurrent job counter 814 in the parameter storage unit 810.

(Step S337) The i-th job control unit releases the waiting state of a thread.

As can be seen from the above flowchart, the i-th job control unit determines whether to submit the i-th category of jobs to the database server 300, when the job priority control is enabled. For this determination, the fourth embodiment tests the following three conditions:

(i) First condition: The number of concurrent jobs including all job categories is smaller than maximum concurrent job count N (see step S312).

(ii) Second condition: The total number of ongoing jobs for every j-th job category in the range of 1 to j is smaller than the j-th threshold $\alpha_j$. (see step S314).

(iii) Third condition: There are no pending jobs of the first to (i−1)th job categories (see step S315).

When the first condition and second condition are both satisfied, or when the first condition and third condition are both satisfied, a connection is allocated to a thread having the i-th category of jobs and used to submit those jobs to the database server 300. On the other hand, jobs are suspended when the first condition is not satisfied, or when the first condition is satisfied, but neither of the second and third conditions is satisfied. The fourth embodiment uses three or more job control units in this way, thus making it possible to manage the priority of jobs according to multiple levels of workload.

(e) Other Embodiments and Variations

The second to fourth embodiments have been described above assuming their implementation in a web three-tier system. These embodiments are, however, not limited to that particular type of multi-tier systems. The person skilled in the art would appreciate that the proposed techniques can also be applied to other kinds of multi-tier computer systems with, for example, different tier hierarchies, different number of servers, or their combinations.

(f) Conclusion

Various embodiments and their variations have been described above. According to one aspect of those embodiments, the proposed techniques alleviate fluctuations of response time of a multi-tier computer system.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. An information processing apparatus coupled to a server, the apparatus comprising a processor configured to perform a procedure including:
   classifying jobs to be executed by the server into a plurality of groups, the groups being ranked in ascending order of workload that the groups of jobs impose on the server;
   counting a number of ongoing jobs that are currently executed on the server and belong to a specified number of top-ranked groups; and
   designating pending jobs that belong to other groups than the specified number of top-ranked groups and suspending submission of processing requests of the designated pending jobs to the server, when the number of ongoing jobs is greater than or equal to a threshold and when there are one or more pending jobs that belong to the specified number of top-ranked groups.

2. The information processing apparatus according to claim 1, wherein the procedure further includes:
   calculating average processing time of each specific group of jobs which the server spent to execute jobs belonging to that specific group;
   calculating an occurrence rate of each specific group of jobs which represents a ratio of jobs belonging to that specific group to an entire set of jobs executed by the server; and
   calculating the threshold based on the average processing time and occurrence rate of each of the groups of jobs.

3. The information processing apparatus according to claim 2, wherein the calculating of the threshold includes:
   calculating, for each of the groups of jobs, a product of the average processing time and occurrence rate;
   obtaining a first sum by adding up the products for all the specified number of top-ranked groups of jobs;
   obtaining a second sum by adding up the products for all the groups of jobs;
   dividing the first sum by the second sum to obtain a quotient; and
   obtaining the threshold by multiplying the quotient by a maximum number of jobs that the server is allowed to execute concurrently.

4. The information processing apparatus according to claim 1, wherein the procedure further includes:
   calculating average processing time of each specific category of jobs that the server spent to execute jobs in that category; and
   determining the groups of jobs in such a way that a category of jobs having a shorter average processing time belongs to a higher-ranked group of jobs.

5. The information processing apparatus according to claim 4, wherein the determining of the groups of jobs includes:
   calculating average processing time of each specific group of jobs which the server spent to execute jobs belonging to that specific group;
   calculating an occurrence rate of each specific group of jobs which represents a ratio of jobs belonging to that specific group to an entire set of jobs executed by the server; and
   producing a plurality of grouping patterns of the categories of jobs to be classified into groups;
   calculating, for each of the produced grouping patterns, a reduction ratio of processing time which is to be obtained by suspending the processing requests for jobs belonging to the other groups than the specified number of top-ranked groups; and
   determining the groups of jobs according to one of the grouping patterns that exhibits a largest reduction ratio.

6. The information processing apparatus according to claim 1, wherein the procedure further includes:
   stopping the suspending of submission of the processing requests when waiting time of the processing requests for the jobs belonging to the other groups than the specified number of top-ranked groups of jobs exceeds a specified upper limit.

7. The information processing apparatus according to claim 6, wherein the procedure further includes:
   restarting the suspending of submission of the processing requests when waiting time of the processing requests for the jobs belonging to the other groups than the specified number of top-ranked groups of jobs falls below a specified lower limit.

8. The information processing apparatus according to claim 1, wherein the suspending suspends submission of the processing requests of the designated pending jobs by preventing allocation of connections for sending the processing requests to the server.

9. A non-transitory computer-readable storage medium storing a program for controlling execution of jobs, the program causing a computer to perform a procedure comprising:

classifying jobs to be executed by a server into a plurality of groups, the groups being ranked in ascending order of workload that the groups of jobs impose on the server;

counting a number of ongoing jobs that are currently executed on the server and belong to a specified number of top-ranked groups; and designating pending jobs that belong to other groups than the specified number of top-ranked groups and suspending submission of processing requests of the designated pending jobs to the server, when the number of ongoing jobs is greater than or equal to a threshold and when there are one or more pending jobs that belong to the specified number of top-ranked groups.

10. A method for controlling execution of jobs, comprising:

classifying, by a processor, jobs to be executed by a server into a plurality of groups, the groups being ranked in ascending order of workload that the groups of jobs impose on the server;

counting, by the processor, a number of ongoing jobs that are currently executed on the server and belong to a specified number of top-ranked groups; and designating, by the processor, pending jobs that belong to other groups than the specified number of top-ranked groups and suspending submission of processing requests of the designated pending jobs to the server, when the number of ongoing jobs is greater than or equal to a threshold and when there are one or more pending jobs that belong to the specified number of top-ranked groups.

* * * * *